(12) United States Patent
Gorman

(10) Patent No.: US 9,114,341 B2
(45) Date of Patent: Aug. 25, 2015

(54) HOLDING FRAME ASSEMBLY AND FLEXIBLE RETAINERS FOR SAME

(71) Applicant: CAMFIL FARR, INC., Riverdale, NJ (US)

(72) Inventor: Joseph J. Gorman, Sussex, NJ (US)

(73) Assignee: Camfil USA, Inc., Riverdale, NJ (US)

( * ) Notice: Subject to any disclaimer, the term of this patent is extended or adjusted under 35 U.S.C. 154(b) by 169 days.

(21) Appl. No.: 13/690,858

(22) Filed: Nov. 30, 2012

(65) Prior Publication Data

US 2013/0291504 A1    Nov. 7, 2013

Related U.S. Application Data

(60) Provisional application No. 61/641,217, filed on May 1, 2012.

(51) Int. Cl.
*B01D 46/00* (2006.01)
*B01D 46/10* (2006.01)

(52) U.S. Cl.
CPC ........ *B01D 46/0002* (2013.01); *B01D 46/0005* (2013.01); *B01D 46/10* (2013.01)

(58) Field of Classification Search
CPC ....... B01D 46/10; B01D 46/16; B01D 46/521
USPC .......... 55/494–495, 500–502, 509, 511, 316, 55/357, 387, 467, 486, DIG. 31; 96/57, 98, 96/137–138; 160/371
See application file for complete search history.

(56) References Cited

U.S. PATENT DOCUMENTS

| 971,304 | A | | 9/1910 | Newpher |
|---|---|---|---|---|
| 1,704,601 | A | | 3/1929 | Hall et al. |
| 2,604,675 | A | * | 7/1952 | Seaman ......................... 49/147 |
| 2,880,797 | A | * | 4/1959 | Alvarez et al. ................ 160/328 |
| 3,250,063 | A | | 5/1966 | Andrews et al. |
| 4,749,390 | A | | 6/1988 | Burnett et al. |
| 2005/0230068 | A1 | * | 10/2005 | Green et al. .................. 160/371 |
| 2007/0204575 | A1 | * | 9/2007 | Lisbona ......................... 55/495 |
| 2013/0097979 | A1 | * | 4/2013 | Mann et al. .................... 55/357 |

OTHER PUBLICATIONS

PCT international search report and written opinion of PCT/US 12/66245 dated Feb. 1, 2013.

* cited by examiner

*Primary Examiner* — Robert Clemente
*Assistant Examiner* — Karla Hawkins
(74) *Attorney, Agent, or Firm* — Patterson & Sheridan, LLP

(57) ABSTRACT

A flexible filter retainer and a holding frame assembly having a flexible retainer are provided. In one embodiment, the flexible filter retainer for the holding frame comprises a flat body extending from a first end to a second end. The body comprises a bowed shaped retaining portion disposed at the first end and comprises a first strip and a top face. The body also comprises a fixed portion disposed at the second end and comprises a second strip. The first and second strips are linearly aligned and laterally offset from the top face. In another embodiment, a filter holding frame assembly comprises a holding frame and flexible filter retainers coupled to the holding frame. Each retainer comprises a flat body extending from a first end to a second end. The body comprises a retaining portion disposed at the first end and a fixed portion disposed at the second end.

20 Claims, 18 Drawing Sheets

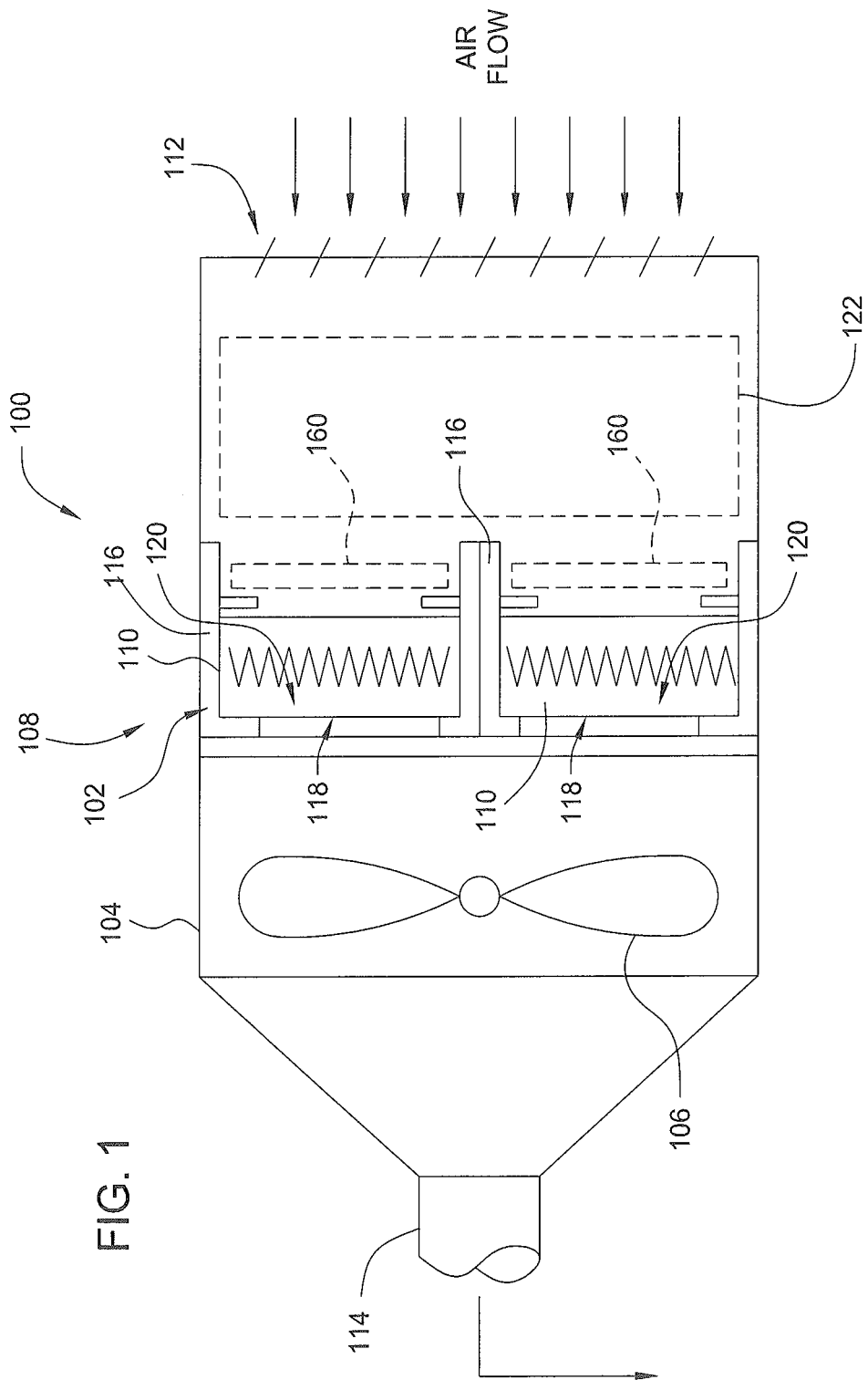

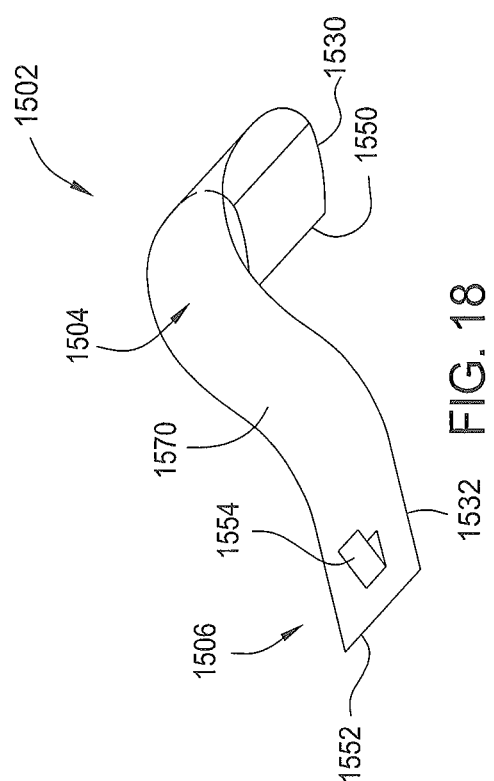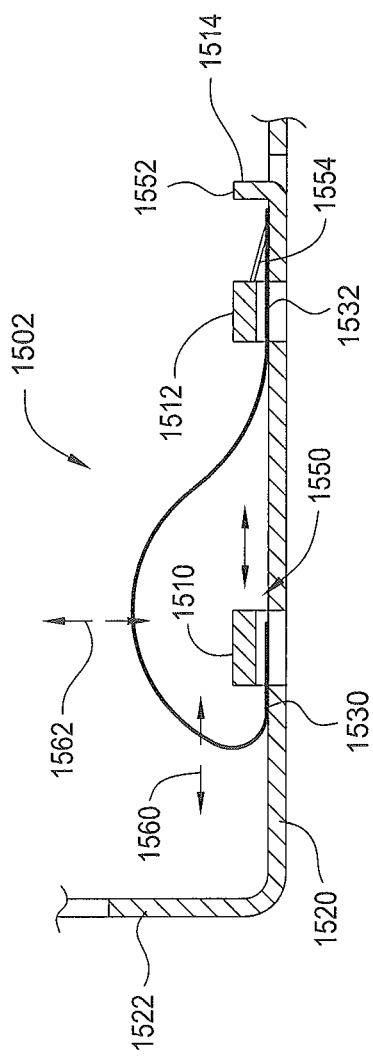

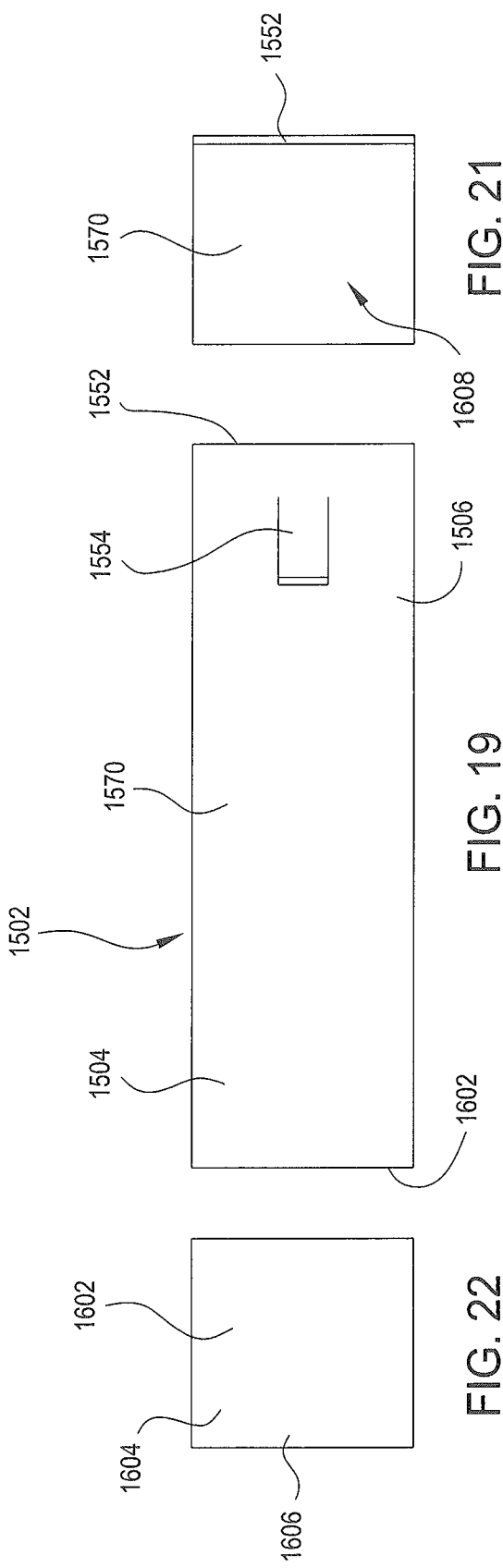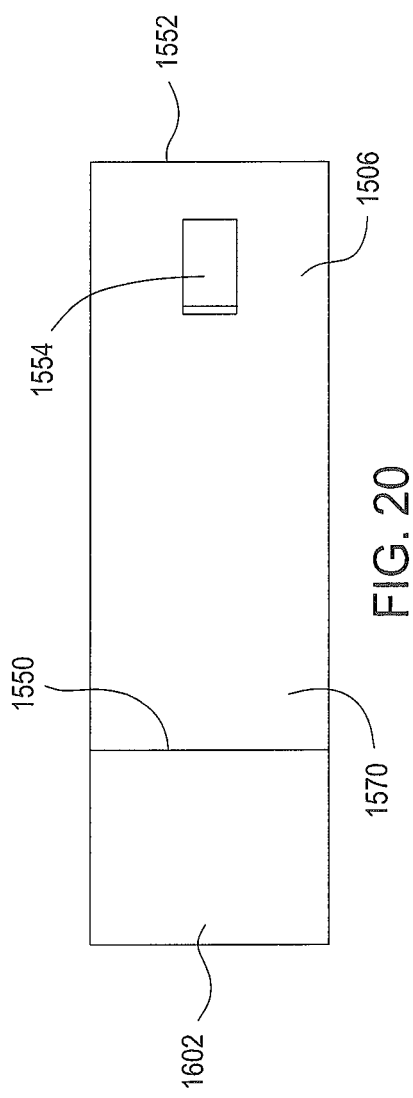

HOLDING FRAME ASSEMBLY AND FLEXIBLE RETAINERS FOR SAME

RELATED APPLICATIONS

This application claims priority to U.S. patent application Ser. No. 61/641,217, filed on May 1, 2012, which is incorporated by reference in its entirety.

BACKGROUND OF THE INVENTION

1. Field of the Invention

Embodiments described herein relate to air handling systems utilizing air treatment. More particularly, embodiments described herein relate to filter holding frame assemblies and flexible retainers for securing filters in the air handling systems.

2. Description of the Related Art

Air filtration systems typically utilize filter holding frames, interchangeably referred to as "holding frames", to secure various combinations of pre-filtration and final filtration elements into an air duct of an air handling system. Filter holding frames, such as Type 8 holding frames available from Camfil Farr, Inc., of Riverdale, N.J., may be used with a variety of fasteners to allow the installation of the various combinations of pre-filtration and final filtration elements. Typically, the fasteners may include any combination of clips, clamps, springs, wires, and/or brackets.

Conventionally, filter holding frames for filtration elements generally use some type of mechanical clamping mechanism. This mechanism is utilized to effectively secure the filtration element to the filter holding frame positioned within the air duct and reduce any bypass or leakage around the filtration element. For example, a HEPA filter with an efficiency of 99.97% has a maximum allowable penetration of 0.03%. In such high efficiency applications, a gasket is typically employed between the filtration element and filter holding frame to effectively prevent bypass of the filtration element. The same methods also occur in medium and low efficiency filtration systems; gaskets are used to minimize bypass between the filtration element and the holding frame.

The need to have clamping devices to seal final filtration elements and various types of fasteners to secure and hold prefilters results in a very time consuming and costly process when filters must be removed and/or installed. This is particularly true on large filtration systems where dozens, if not hundreds, of filters must be removed and replaced on a regular basis. The use of wrenches, ratchets, or other types of tools is often required in order to loosen nuts, bolts, or other fasteners in order to remove the filters from the filter holding frames or to loosen the filter clamping mechanisms.

Additionally, a filter of a particular type and/or size may require a corresponding fastener, such as a particularly sized clip, that is specifically configured to secure the particular filter to the filter holding frame. Securing a filter element to the filter holding frame results in a laborious process to correctly locate a fastener that corresponds to the filter element from a collection of fasteners maintained for filtration systems using diverse types and sizes of filter elements. Further, a fastener typically engages with a set of mating bosses or lances formed through the filter holding frame to secure a filter element. To accommodate a wide variety of fasteners, multiple sets of bosses or lances are formed through the filter holding frame, resulting in additional labor and cost, even though many sets of holes may go unused.

Thus, there is a need for a filter holding frame assembly with a retention mechanism that does not require the use of tools to operate, that can be used to effectively secure prefilters, low-, and medium-efficiency filters in the filter holding frame and that reduces need to support a fragmented marketplace of fasteners.

SUMMARY OF THE INVENTION

Embodiments of the inventions include a filter retainer and a holding frame assembly having the flexible retainer. In one embodiment, a flexible filter retainer for a holding frame, comprises a flat body extending from a first end to a second end. The body comprises a bowed shaped retaining portion disposed at the first end and comprises a first strip and a top face. The body also comprises a fixed portion disposed at the second end and comprises a second strip. The first and second strips are linearly aligned and laterally offset from the top face.

In another embodiment, a filter holding frame assembly comprises a holding frame having a plurality of walls coupled to form a quadrilateral ring, and a flange extending inward from a back edge of each wall. The holding frame further comprises flexible filter retainers coupled to the holding frame. Each retainer comprises a flat body extending from a first end to a second end. The body comprises a retaining portion disposed at the first end and fixedly coupled to the holding frame, and a fixed portion disposed at the second end and slideaby coupled to the holding frame.

Other embodiments of the invention generally include a filter holding frame having a plurality of walls coupled to form a rectangular ring. The filter holding frame further includes a flange extending inward from a back edge of each wall and at least one flexible retaining member coupled to at least one of the walls and positioned in a parallel spaced-apart relation proximate to one of the flanges. The filter holding frame is configured such that an upstream surface of the flange and a downstream surface of the flexible retaining member define a filter receiving pocket for retaining a filter element.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a schematic sectional view of an air handler having a holding frame assembly that includes at least one holding frame installed therein, according to one embodiment of the invention.

FIG. 17 is a partial side view of the holding frame assembly of FIG. 15 illustrating a side view of the flexible retainer secured to the holding frame.

FIG. 18 is a perspective view of the filter retaining flexible retainer of FIG. 15.

FIG. 19 is a top view of the filter retaining flexible retainer of FIG. 15.

FIG. 20 is a bottom view of the filter retaining flexible retainer of FIG. 15.

FIG. 21 is a side view of the filter retaining flexible retainer of FIG. 15.

FIG. 22 is another side view of the filter retaining flexible retainer of FIG. 15.

To facilitate understanding, identical reference numerals have been used, wherever possible, to designate identical elements that are common to the figures. It is contemplated that elements of one embodiment may be beneficially incorporated in other embodiments without further recitation.

DETAILED DESCRIPTION

Figure 2A:
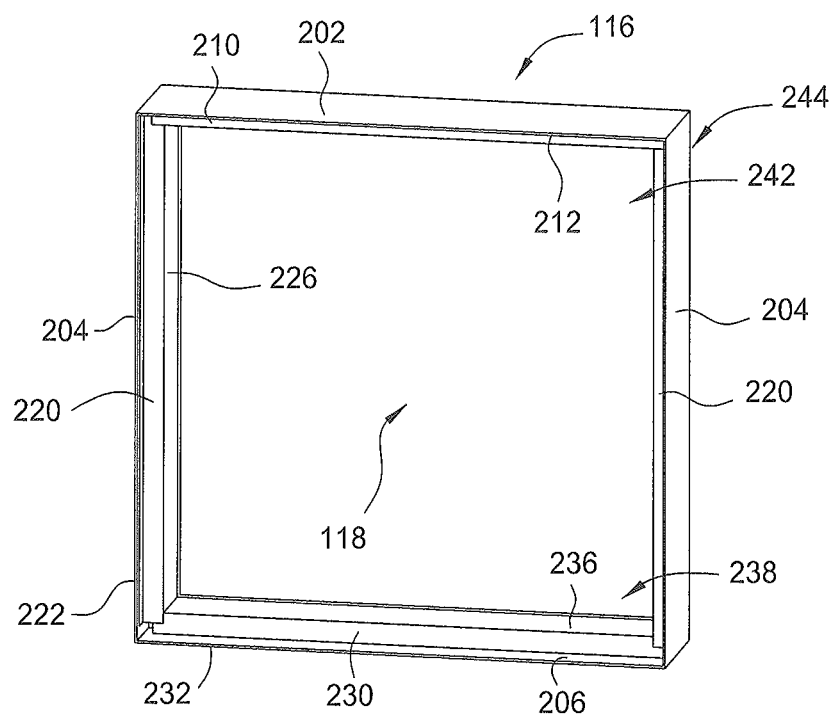
FIGS. 2A-2C depict a perspective view, a front plan view, and a partial perspective view, respectively, of the holding frame of FIG. 1.

Embodiments of the invention generally provide a holding frame having one or more rigid retainers and/or flexible retainers. The holding frame may be mounted in a housing of an air handler or other air moving conduit. The rigid retainer(s) and flexible retainer(s) are coupled to the holding frame to define a filter retaining pocket that is configured to retain a final filter within the holding frame without the need for any secondary mechanical fasteners or clips. In other embodiments, additional retainers may be utilized to retain a prefilter upstream of the final filter. When a final filter or prefilter is inserted and pivoted into the holding frame, the flexible retainers deflect upon contact to permit entry of the filter element (i.e., the final and/or prefilter element) within the holding frame. The flexible retainers may, in one embodiment, substantially return to their original position to retain the filter element or, in another embodiment, retain the filter element while in a deflected position. The use of rigid and/or flexible retainers facilitates removal and replacement of final filters and/or prefilters without tools or specific fasteners (e.g., clips) thereby substantially reducing the expense associated with filter change out.

FIG. 1 is a schematic sectional view of an air handler 100 having a holding frame assembly 102 installed therein, according to one embodiment of the invention. Although the holding frame assembly 102 is shown mounted inside the air handler 100, it is contemplated that the holding frame assembly 102 may be utilized advantageously in or associated with other air moving conduits.

The air handler 100 generally includes a housing 104 which contains a blower 106 and a filter bank 108 having one or more final filters 110 and optionally, one or more prefilters 160 (shown in phantom) mounted to the holding frame assembly 102. The housing 104 may include an access door 122 to facilitate replacement of the final filters 110 and/or prefilters 160. The blower 106 draws air into the housing 104 through a grate 112 and through the filter bank 108, exhausting the filtered air from the housing 104 into a conduit 114. The filtered air leaving the air handler 100 through the conduit 114 is typically routed to a facility or other location. Although the blower 106 is shown on the downstream side of the holding frame assembly 102, the blower 106 may alternatively be located in an upstream location.

The holding frame assembly 102 is sealingly coupled to the housing 104 and supports the one or more final filters 110 and optional prefilters 160 comprising the filter bank 108. The holding frame assembly 102 may be sealed to the housing 104 by welding, caulking, gaskets, or other suitable methods. Generally, the holding frame assembly 102 includes one or more holding frames 116, each having a central aperture 118 and configured to hold a single final filter 110 and associated prefilter 160. The number of holding frames 116 comprising the holding frame assembly 102 is selected to accommodate a predefined number of final filters 110 for which the air handler 100 was designed. The holding frames 116 are secured to each other in a grid pattern. In the embodiment depicted in FIG. 1, the holding frame assembly 102 includes a plurality of holding frames 116 arranged into a plurality of aperture rows 120 for supporting an upper and lower tier of final filters 110.

A "filter element", as described herein, generally refers to any device or product that is used for the purpose of removing air particulate from the air stream. In one embodiment, the filter element comprises filter media housed within a filter frame. The filter media may be pleated to increase the surface area available for air passage and increase filtration efficiency of the filter element. The filter frame is generally comprised of three or more sides enclosing an open passage. The sides of the filter frame may have a C-shaped profile that accepts the edge of the filter media and may be fabricated from aluminum, sheet metal, plastic, paper (meaning to include paperlike products), wood or other suitable material. In the embodiment depicted in FIG. 1, the filter element has a quadrilateral form. In an alternative embodiment, as seen in FIGS. 12B-C, the filter element may have a trapezoidal form. In embodiments described herein, a filter element may refer to a final filter 110 or a prefilter 160.

In one embodiment, final filters 110 may be one of American Society of Heating Refrigeration and Air Conditioning Engineers (ASHRAE) rated or a Minimum Efficiency Reporting Value (MERV) rated filter, 95% DOP filter, a HEPA filter, or a filter of other efficiency. Other examples of final filters that may be utilized with embodiments of the invention include, but are not limited to, 1" deep panel or pleated filters, 2" deep panel or pleated filters, 4" deep panel or pleated filters, 6" or 12" deep rigid filters, headered-style rigid or pocket filters and v-bank filters, among others. In one embodiment, the prefilters 160 may be ASHRAE-rated, MERV-rated, EN779-rated or other suitable first stage filters.

Figure 2B:
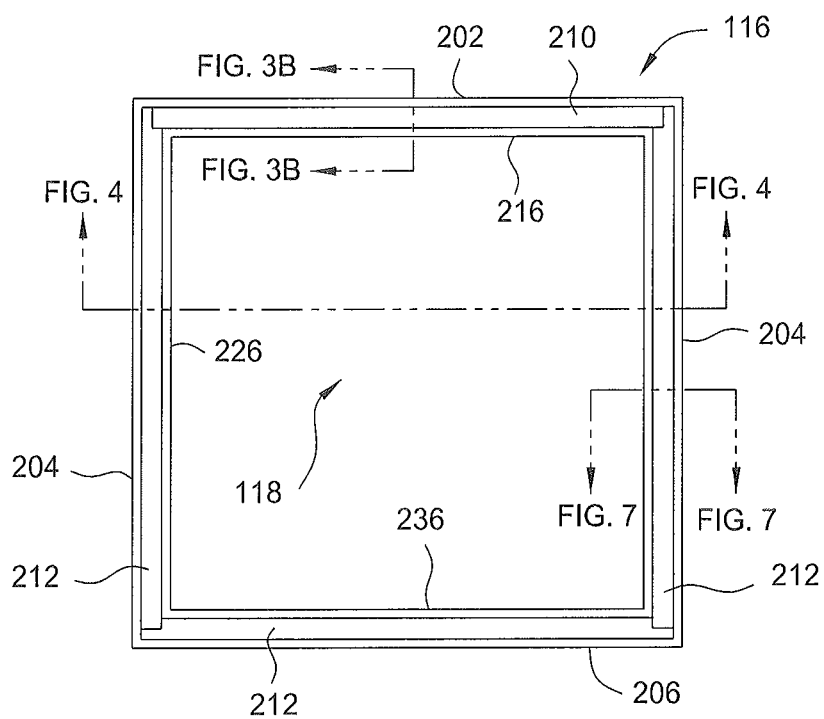

FIGS. 2A and 2B depict a perspective view and a front plan view, respectively, of a holding frame 116 according to one embodiment of the invention. The holding frame 116 includes four walls, e.g., a top wall 202, two side walls 204, and a bottom wall 206 that are coupled to form a rectangular ring bounding the central aperture 118. In one embodiment, the top wall 202, side walls 204, and bottom wall 206 include open edges 212, 222, 232 that define the central aperture 118 of the holding frame 116. The walls 202, 204, 206 also include back flanges 216, 226, 236 that extend inward 90 degrees from the plane of the walls 202, 204, 206 to define an airflow outlet 244 of the holding frame 116. The walls 202, 204, 206 and back flanges 216, 226, 236 may be fabricated from a single or multiple elements.

In one embodiment, the holding frame 116 includes at least one rigid retainer 210 and/or at least one flexible retainer 220, 230 configured to retain the final filter 110 within the holding frame 116 such that air flowing through the holding frame 116 must pass through the central aperture 118, the final filter 110 disposed therein, and the airflow outlet 244.

Figure 2C:
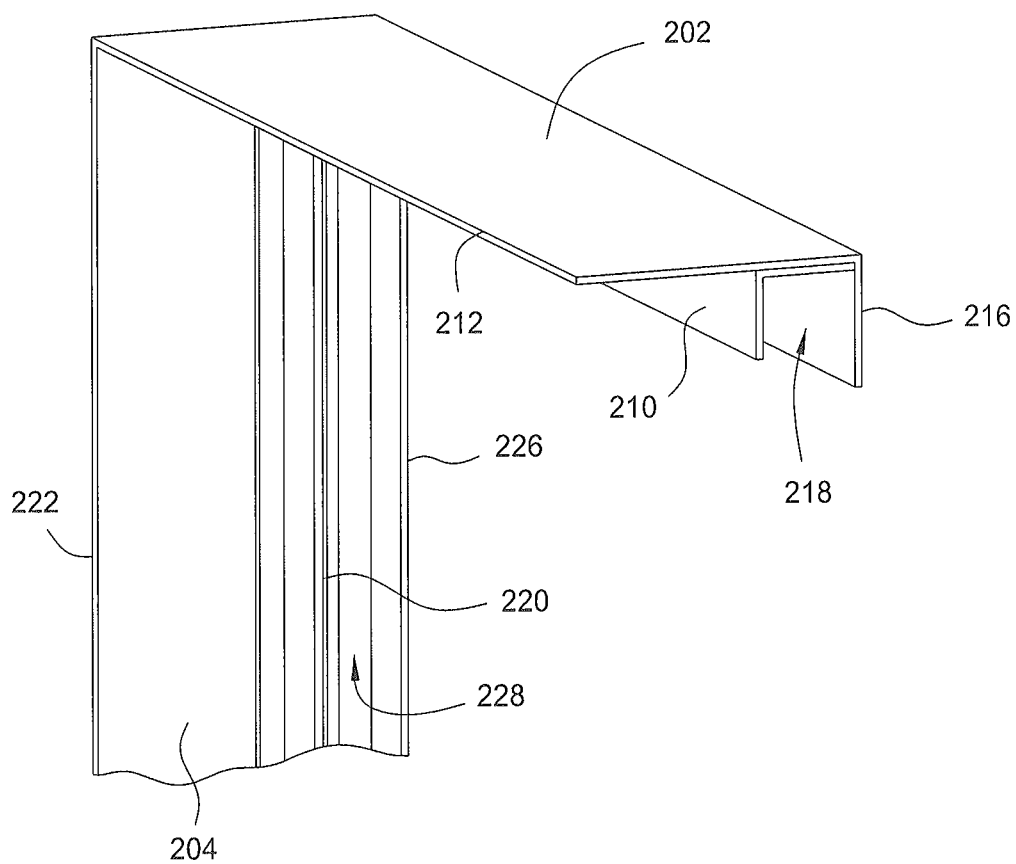

It is appreciated that, while FIGS. 2A-C depict one embodiment of the holding frame 116 having a rigid retainer 210 and three flexible retainers, various configurations of rigid retainer(s) and flexible retainer(s) may be used to secure a final filter 110 within the holding frame 116. It is appreciated that a configuration of the holding frame 116 may include various rigid retainer(s) and flexible retainer(s) interchanged, added, and/or subtracted. For example, one embodiment of the holding frame 116 may include two or more flexible retainers coupled to opposing walls of the holding frame 116 and no rigid retainers. In another example, an embodiment of the holding frame 116 may include a rigid retainer 210 coupled to one wall (e.g., top wall 202) and additional flexible retainers 220 may be coupled to adjacent walls (e.g., sidewalls 204). In yet another example, an embodiment of the holding frame 116 may include a rigid retainer 210 coupled to one wall (e.g., top wall) and a single flexible retainer 220 coupled to an opposing wall (e.g., bottom wall), with additional flexible retainers coupled to adjacent walls (e.g., side walls). Generally, only one flexible retainer 220, 230 may be needed when used with a rigid retainer 210, while at least two flexible retainers 220, 230 are used in embodiments where a rigid retainer 210 is not present. Accordingly, it is appreciated that discussion of the rigid retainer 210, particularly pertaining to positioning and arrangement of the rigid retainer 210 in the holding frame 116, may be extended to the flexible retainers 220, 230, and vice versa.

For the sake of discussion, embodiments of the invention are described in relation to a direction of air flow, for example, such as the air flow shown in FIG. 1. Further, the terms "upstream" and "downstream" may be used herein to describe the arrangement and configuration of components of embodiments of the invention relative to such a directional air flow (e.g., "downstream side"). However, it is contemplated that embodiments of the invention may be configured to be suitable for use with a "reversed" or opposite direction of air flow. As such, it is understood that such terms as "downstream" or "upstream" do not in any way limit or restrict embodiments of the invention or manners in which embodiments of the invention may be utilized, but rather, provide clarification for the arrangement and configuration of said components relative to one exemplary direction of air flow.

The rigid retainer 210 extends from at least one of the walls 202, 204, 206 into the central aperture 118 and is intended for use with at least one flexible retainer 220, 230. The rigid retainer 210 holds the final filter 110 within the holding frame 116 proximate the flanges 216, 226, 236 and airflow outlet 244. The rigid retainer 210 and the flanges 216, 226, 236 include parallel surfaces in a spaced apart relation that defines a pocket for receiving the final filter 110. The parallel surfaces are fixed in relation to each other when the rigid retainer 210 is secured to the least one of the walls 202, 204, 206.

In the embodiment shown in FIG. 2A-C, the rigid retainer 210 is coupled to the top wall 202 and extends from the top wall 202 into the central aperture 118. The rigid retainer 210 is spaced apart from the back flange 216 so as to define a rigid filter receiving pocket 218 configured to retain a side (e.g., a top side) of the final filter 110. The position of the rigid retainer 210 relative to the back flange 216 is selected to define the rigid filter receiving pocket 218 having a predetermined size. The height of the rigid retainer 210 is selected to allow the final filter 110 to be inserted into the rigid filter receiving pocket 218 at an angle relative to the holding frame 116. The rigid retainer 210 may have a length substantially spanning the top wall 202, or in an alternative embodiment, may include a plurality of segments disposed on the top wall 202. The rigid retainer 210 is shown in further detail in FIG. 3.

In one embodiment, the holding frame 116 may include one or more flexible retainers 220, 230 configured to retain the final filter 110 within the holding frame 116 such that air flowing through the holding frame 116 must pass through the central aperture 118, the final filter 110 disposed therein, and the airflow outlet 244. The one or more flexible retainers 220, 230 are coupled to at least one of the walls 202, 204, 206. The flexible retainers 220, 230 are configured to bend from an original position to permit insertion of the final filter 110 into the holding frame 116. The one or more flexible retainers 220, 230 have a resiliency sufficient to return to the original position and/or provide additional support of the final filter 110 within the holding frame 116. For example, in one embodiment, the flexible retainers 220, 230 may bend to allow the final filter 110 to pass over the flexible retainers and return to a position that retains the final filter 110. The one or more flexible retainers 220, 230 may be flexible enough to permit the final filter 110 to be pulled out when the final filter 110 is replaced.

In the embodiment shown in FIGS. 2A-C, two flexible retainers 220 and a flexible retainer 230 are coupled to opposing side walls 204 and the bottom wall 206, respectively, and extend from the side walls 204 and bottom wall 206 into the central aperture 118. The flexible retainers 220 may be spaced apart from the back flanges 226 of the side walls 204 so as to define a filter receiving pocket 228 for retaining sides (e.g., lateral sides) of a final filter 110. Similarly, the flexible retainer 230 may be spaced apart from the back flange 236 of the bottom wall 206 to define a flexible filter receiving pocket 238 for retaining a side (e.g., a bottom side) of a final filter 110. The rigid retainer 210 may have a length substantially spanning the top wall 202, or in an alternative embodiment, may include a plurality of segments disposed on the top wall 202. The flexible retainers 220, 230 are shown in further detail in FIG. 7.

According to one embodiment, to install a final filter 110 at a predefined position in the holding frame 116, a top end of the final filter 110 may be inserted into the rigid filter receiving pocket 218 at an angle relative to the holding frame 116. The final filter 110 may then be pivoted at the top end to rotate the final filter 110 into a vertical orientation within the holding frame 116. As the final filter 110 is rotated into the vertical position, the sides of the final filter 110 contact the flexible retainers 220, 230, causing the flexible retainers 220, 230 to bend and allow the final filter 110 to move past the retainer 220, 230 and into the filter receiving pockets 228, 238 of the side walls 204 and bottom wall 206. The shape and position of the flexible retainers 220, 230 may be selected to retain the sides of the final filter 110 when the final filter 110 is disposed within the filter receiving pockets 228, 238, as described below.

Figure 3:
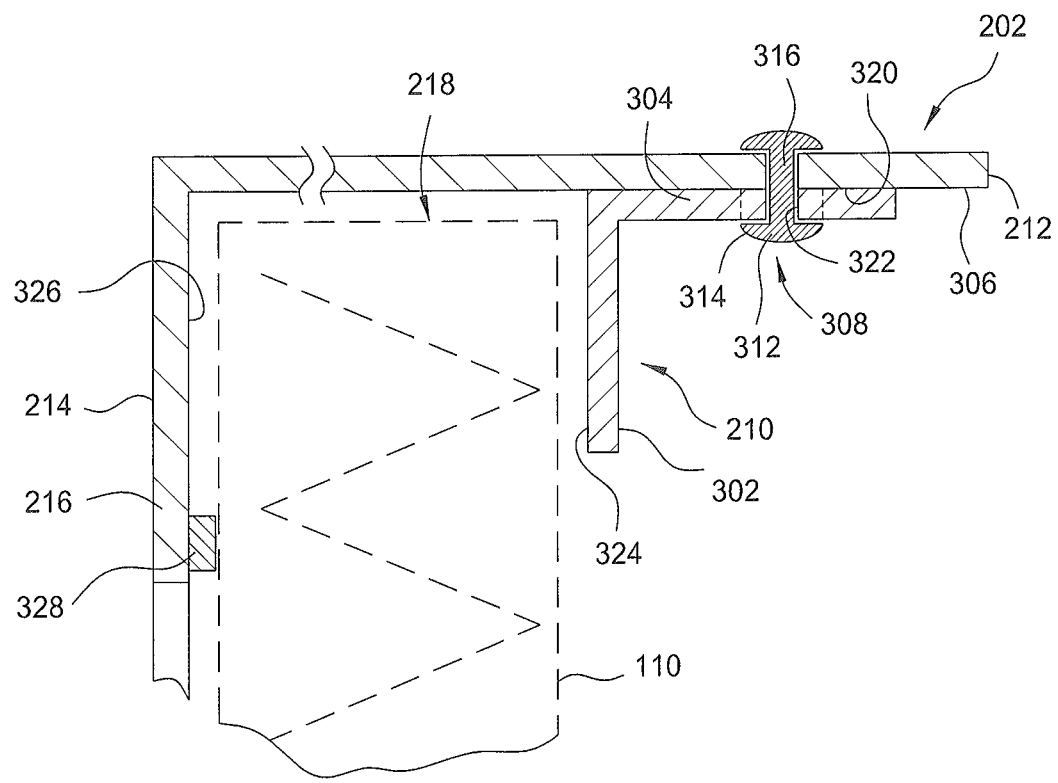
FIG. 3 is a partial sectional view of a rigid retainer according to one embodiment of the invention.

FIG. 3 is a partial sectional view of the rigid retainer 210 coupled to the top wall 202 of the holding frame 116. In the embodiment shown, the rigid retainer 210 includes a flange 302 and a mounting portion 304 coupled to form an L-shaped cross-section. The mounting portion 304 is coupled to an inner surface 306 of the top wall 202 by one or more engagement features 308. The flange 302 extends from the mounting portion 304 towards the central aperture 118. In the embodiment shown, the flange 302 is oriented substantially normal to the mounting portion 304. The rigid retainer 210 may be positioned within the holding frame such that the flange 302 and back flange 216 are spaced apart to define the filter receiving pocket 218. The rigid retainer 210 is coupled to the wall in a position selected so that the filter receiving pocket 218 will accommodate the final filter 110 therein, as shown in phantom in FIG. 3. In the embodiment shown, the flange 302 includes a downstream surface 324 that is parallel to and spaced apart from an upstream surface 326 of the back flange 216 so as filter receiving pocket 218. The downstream surface 324 and the upstream surface 326 may be fixed in relation to each other when the rigid retainer 210 is secured to the wall by the engagement feature 308.

In one embodiment, the rigid retainer 210 is positioned to maintain contact between the final filter 110 and an optional gasket 328 disposed on a downstream side of the final filter 110 such that the final filter 110 is substantially sealed against the holding frame 116. A second gasket (not shown) may additionally be provided on the upstream side of the final filter 110.

In one embodiment, the rigid retainer 210 may be formed from a rigid material, including but not limited to, metal, such as aluminum, or plastic, such as polyethylene. The flange 302 and the mounting portion 304 of the rigid retainer 210 may form a unitary body. In an alternative embodiment, the flange 302 may be coupled to the mounting portion 304 through welding, adhesive, and other suitable fastening techniques. The rigid retainer 210 may be a repositionable component removably coupled to the holding frame 116. In another embodiment, the rigid retainer 210 may be integral to the holding frame 116, for example, as a lanced tab.

In one embodiment, the rigid retainer 210 may have a length that spans an inner surface 306 of the top wall 202 to secure the final filter 110 along the entire length of the top wall 202. In an alternative embodiment (not shown), the rigid retainer 210 is sized much shorter than the inner surface 306 of the top wall 202. For example, the rigid retainer 210 may have a length of 2-6 inches. Optionally, multiple rigid retainers may be spaced laterally along the length of the inner surface 306 to secure the final filter 110 at pre-determined positions along the length of the top wall 202.

The engagement feature 308 is a male (or female) element configured to mate with corresponding female (or male) element formed on or attached to the wall or the holding frame 116. The engagement feature 308 allows the rigid retainer 210 to be removably coupled to the top wall 202. In the embodiment shown in FIG. 3, the male element is a button 312 having a head 314 coupled to the top wall 202 by a shaft 316 extending therefrom. The male element (i.e., the button 312) may be integral to the top wall 202 or may be a component coupled to the top wall 202 through rivets, welding, or other suitable fastening means. The male element 312 extends from the top wall 202 to a portion (i.e., the head 314) substantially horizontal and parallel to the top wall 202. The male element 312 is configured to mate with a corresponding female element formed through or on the mounting portion 304 to secure the mounting portion to the top wall 202. In the embodiment shown, the female element of the engagement feature 308 is a keyhole 318 having a hole 320 and a slot 322 formed through the mounting portion 304.

Figure 4:
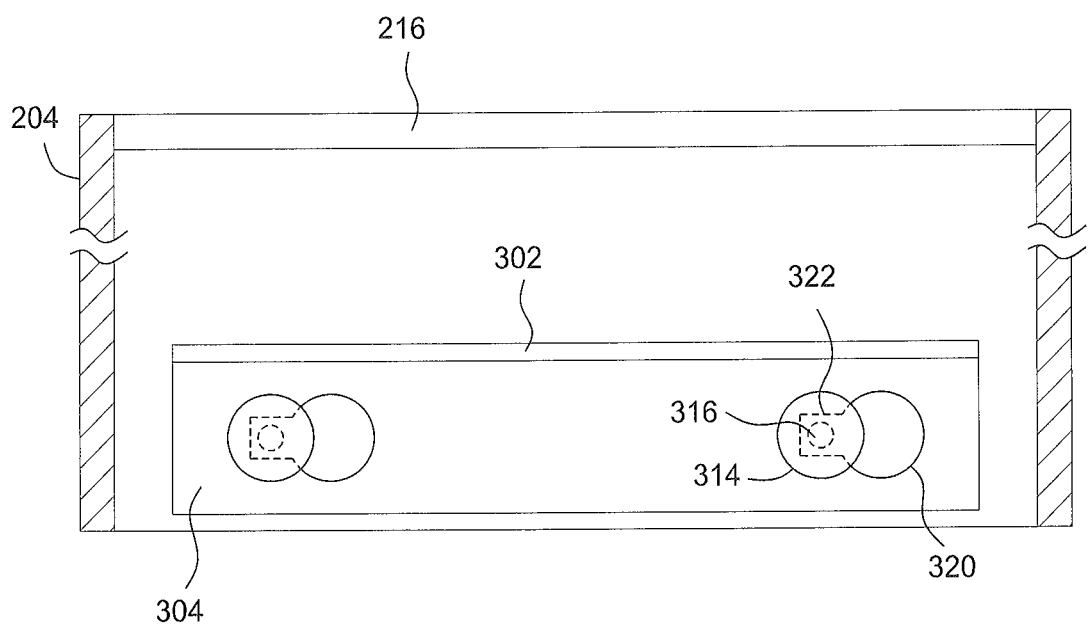
FIG. 4 is a sectional view of the holding frame of FIG. 2B according to one embodiment of the invention.

The engagement features 308 are shown in additional detail in FIG. 4, which is a sectional view of the holding frame 116 of FIG. 2A according to one embodiment of the invention. For clarity, the flexible retainers 220, 230 are not depicted.

To couple the rigid retainer 210 to the top wall 202, the rigid retainer 210 may be disposed on the top wall 202 such that the buttons 312 pass through the holes 320 of the mounting portion 304. The rigid retainer 210 may then be moved laterally such that the shafts 316 are retained in the slots 322 in a snug-fit manner (as shown in phantom in FIG. 4) and the heads 314 are retained against the mounting portion of the rigid retainer 210. FIG. 4 depicts one embodiment of the invention having a rigid retainer 210 coupled to a set of engagement features 308 in a position proximate to the airflow outlet 244 of the holding frame 116. Other suitable positions and configurations of the rigid retainer 210 are contemplated, and are discussed in further detail in FIG. 9A.

It is contemplated that embodiments of the invention may be extended to interchange the male elements 312 and female elements 318 of the engagement features 308 such that the male element 312 may be coupled to the mounting portion 304, and the female element 318 is formed through the top wall 202. In addition to the button 312 and keyhole 318 configuration of FIG. 3, various embodiments of the engagement features 308 are contemplated, for example, as shown and discussed in detail in FIGS. 5AB and FIGS. 6A-C. It is understood that the various embodiments of engagement features 308 described herein may be utilized to couple the rigid retainer 210 to any of the other walls 204, 206 of the holding frame 116. It is further understood that the various embodiments of the engagement features 308 may be utilized to couple the one or more flexible retainers 220, 230 to any of the walls 202, 204, 206 of the holding frame 116.

Figure 5A:
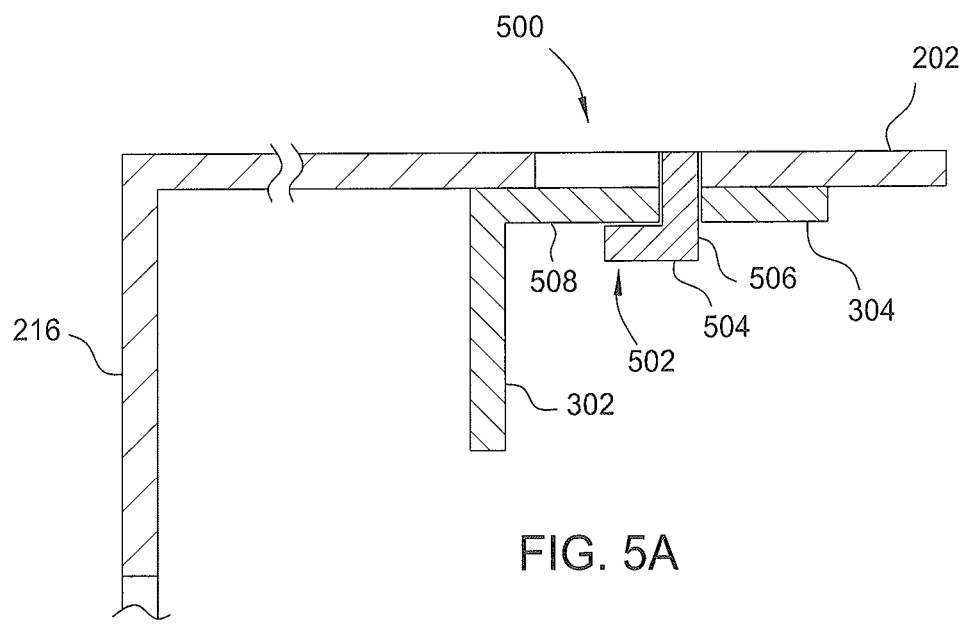
FIGS. 5A and 5B depict a partial sectional view and perspective view, respectively, of an alternative embodiment of an engagement feature.
Figure 5B:
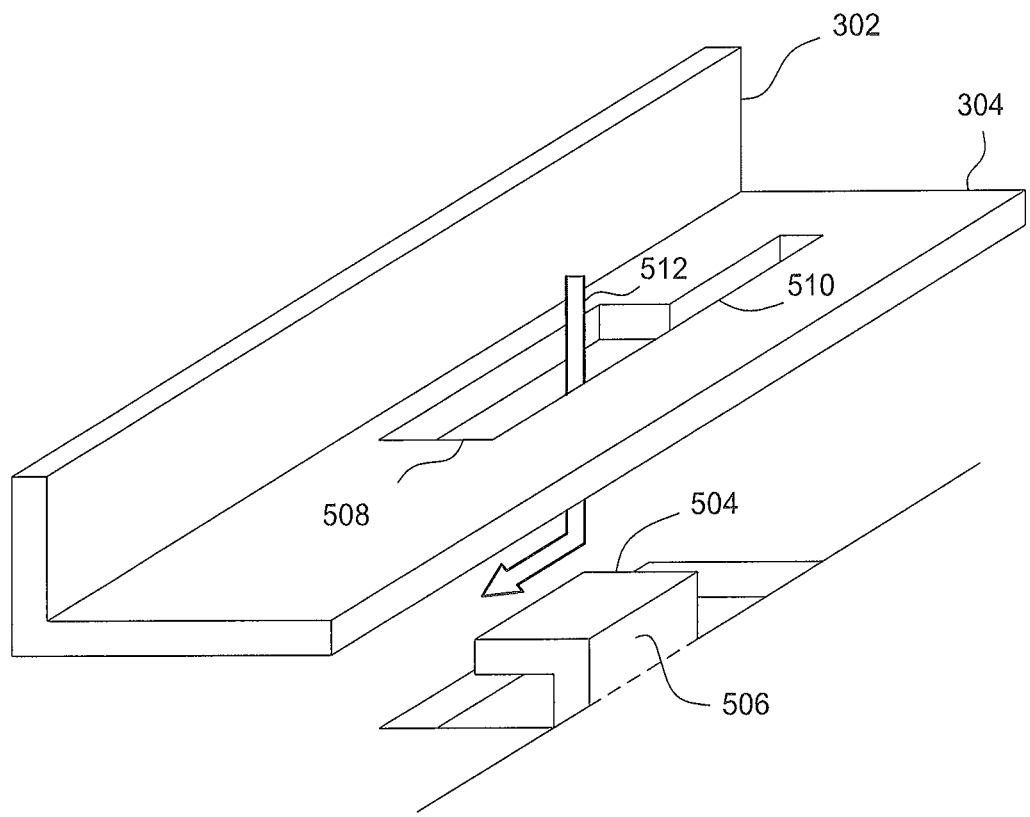

FIGS. 5A and 5B depict a partial sectional view and perspective view, respectively, of an alternative embodiment of an engagement feature 500 for coupling the rigid retainer 210 to the top wall 202. The engagement feature 500 includes a tab 502 having a substantially horizontal portion 504 extending from the top wall 202 via a substantially vertical portion 506. The tab 502 is configured to mate with an aperture 508 formed through the mounting portion 304. In one embodiment, the rigid retainer 210 may be slotted onto the tab 502 and laterally slid to secure the substantially vertical portion 506 in a narrow slot 510 of the aperture 508 (as shown by arrow 512). The substantially horizontal portion 504 is retained against the mounting portion 304 to secure the rigid retainer 210 to the top wall 202. In an alternative embodiment, the engagement feature 500 may be reversed such that a tab 502 extends from the mounting portion 304 to mate with an aperture 508 formed in the top wall 202. In another embodiment, a tab 502 may extend from the top wall 202 to mate with a notch formed in the mounting portion 304.

Figure 6A:
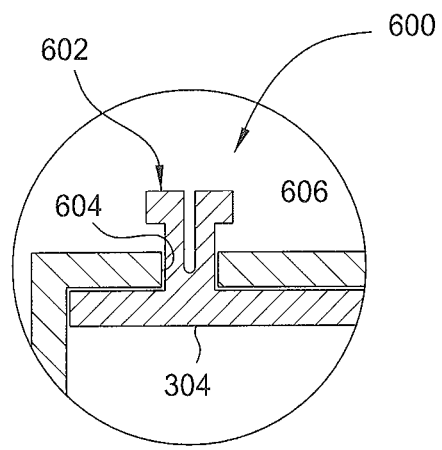
FIGS. 6A-6C are enlarged sectional views of alternative embodiments of an engagement feature, according to one embodiment of the invention.
Figure 6B:
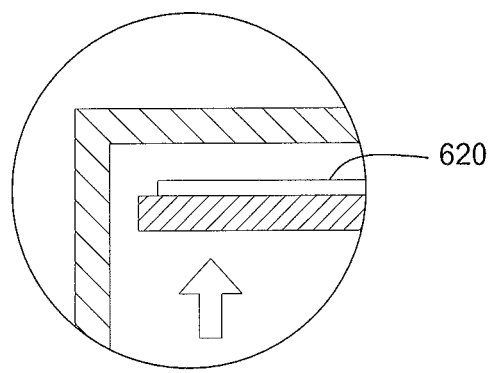
Figure 6C:
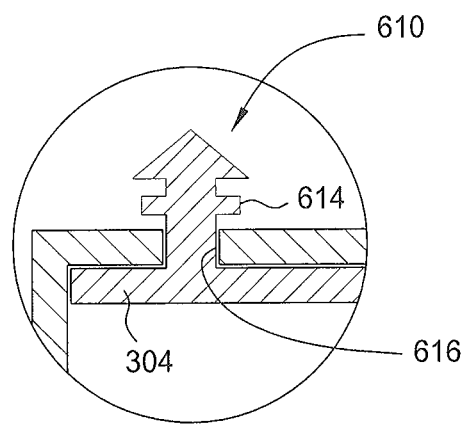

FIGS. 6A-6C depict enlarged sectional views of alternative embodiments of an engagement feature that are configured to couple the rigid retainer 210 to the holding frame 116.

In an embodiment shown in FIG. 6A, the engagement feature 600 is a plurality of fingers 602 extending from the mounting portion 304 of the rigid retainer 210 and mating with an aperture 604 formed in the top wall 202. The fingers 602 may displace laterally to secure against the inner diameter of the aperture 604 and may optionally include flanges 606 disposed on the distal ends of the fingers 602 to prevent inadvertent removal from the aperture 604. According to another embodiment, as shown in FIG. 6B, an engagement feature 610 may be a barbed member 612 extending from the mounting portion 304. The barbed member 612 may include one or more barbs 614 extending laterally from the barbed member 612 to prevent removal from the aperture 616 formed through the holding frame 116. In another embodiment shown in FIG. 6C, the rigid retainer 210 may be coupled to the holding frame 116 via a pressure sensitive adhesive 620. It is also contemplated that the rigid retainer 210 may be secured using other techniques, including but not limited to, adhesives, tapes, rivets, fasteners and welding, among others.

Figure 7:
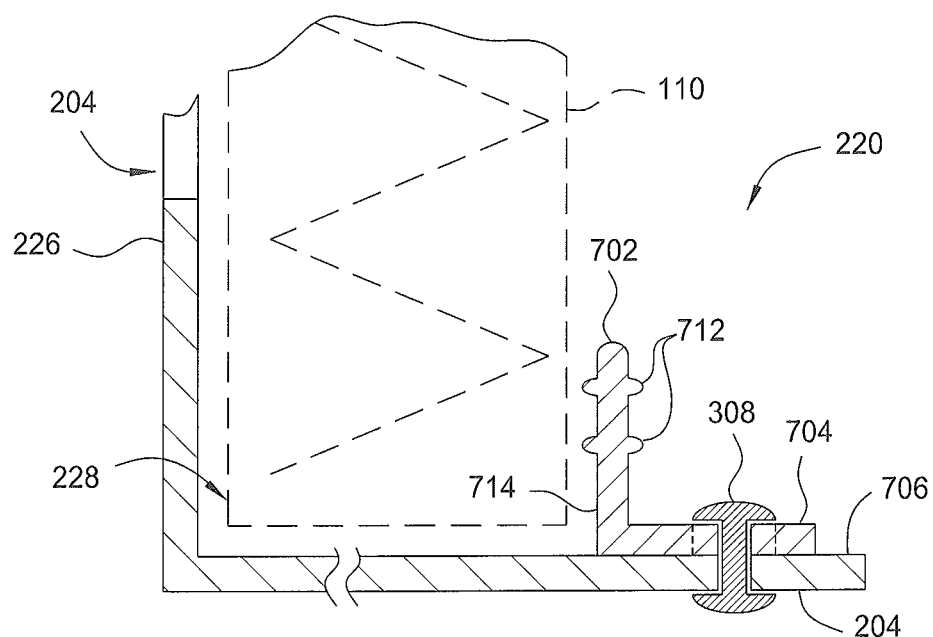
FIG. 7 is a partial sectional view of a flexible retainer of the holding frame according to one embodiment of the invention.

FIG. 7 is a partial sectional view of the flexible retainer 220 coupled to the side wall 204 of the holding frame 116 according to one embodiment of the invention. It is understood that the flexible retainer 230 coupled to the bottom wall 206 is similarly configured as the flexible retainer 220. In one embodiment, the flexible retainer 220 includes a flange 702 and a mounting portion 704. The flange 702 extends from the mounting portion 704 towards the central aperture 118 in an orientation substantially normal to the side wall 204.

In one embodiment, the flexible retainer 220 is removably coupled to the side wall 204 at one or more pre-defined positions. The flexible retainer 220 may be positioned within the holding frame such that the flange 702 and back flange 226 are spaced apart to define the filter receiving pocket 228. In the embodiment shown, the mounting portion 704 of the flexible retainer 220 is coupled to an inner surface of 706 of the side wall 204 by an engagement feature 308 at a first position proximate to the back flanges 226 by engagement features 308. Other suitable configurations and/or positions of the flexible retainers 220 are contemplated, and are discussed further detail below.

In one embodiment, the flexible retainer 220 is configured to bend to permit entry of a final filter 110 into the filter receiving pocket 228 defined between the flexible retainer 220 and the back flange 226. The height of the flange 702 is selected such that the flange 702 may bend to provide clearance for the final filter 110 during installation of the final filter 110 and to retain the final filter 110 once returned to an original position, as shown in FIG. 7.

In one embodiment, the flange 702 may optionally include one or more surface features 712 configured to facilitate securement of a portion of the final filter 110 in the filter receiving pocket 228. The surface features 712 may be disposed on a downstream side of the flange 702, on an upstream side of the flange 702, and/or a combination thereof. The geometry of surface features 712 may be selected to aid gripping and increase friction between the flange 702 and the portion of the final filter 110 disposed in the filter receiving pocket 228. In one embodiment, the surface features may include ribs, bumps, ridges, grooves, flanges, coarse surface texture, and other suitable raised, indented, extended, and/or uneven surface features.

In one embodiment, the flexible retainer 220 may include a unitary body having a length that substantially spans the inner surface 706 of the side wall 204. Alternatively, the flexible retainer 220 may include one or more segments distributed along a length of the side walls 204, wherein the segments are much shorter than a length of the wall; for example, less than one-half the length of the walls 202, 204, 206.

In one embodiment, the flange 702 may be formed from a resilient material having flexibility sufficient to yield to solid contact from a portion of the final filter 110 and return to an original upright position. In one embodiment, the flange 702 may be formed from resilient materials including, but not limited to, polymers such as plastics and elastomers, for example, polyethylene, nitrite and butyl and rubber. In another embodiment, the flexible retainer 220 may include a brush having bristle members. In embodiments described herein, the flange 702 and the mounting portion 704 of the flexible retainer 220 form a unitary body. In an alternative embodiment, the flange 702 may be coupled to the mounting portion 704 through welding, adhesive, and other suitable fastening techniques. It is contemplated that the flexible retainer 220 may be a replaceable component removably coupled to the holding frame 116 that may be changed out periodically based on the wear and/or loss of resilience of the flange 702.

Figure 8:
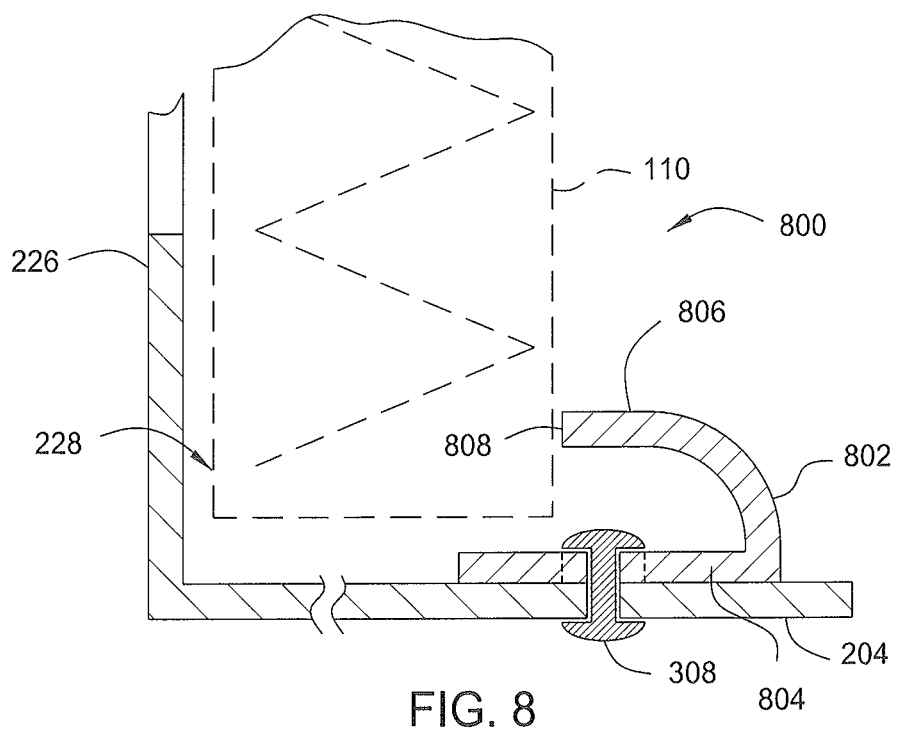
FIG. 8 is a partial sectional view of an alternative embodiment of the flexible retainer of FIG. 7 according to one embodiment of the invention.

FIG. 8 is a partial sectional view of an alternative embodiment of a flexible retainer 800 disposed within the holding frame 116. As shown in FIG. 8, the flexible retainer 800 includes a tab 802 that extends from a mounting portion 804 removably coupled to the sidewall 204 by the engagement feature 308. The flexible retainer 800 is positioned within the holding frame 116 such that the tab 802 and the back flange 226 are spaced apart to define a filter receiving pocket 228.

In one embodiment, the tab 802 includes a flexible body 806 that is oriented substantially parallel to the sidewall 204 and has a distal end 808 directed towards the back flange 226. The flexible body 806 is configured to bend and deflect downwards upon contact and has a resiliency sufficient to return to its original, substantially parallel position when no longer contacted. During a filter installation procedure, a final filter 110 is urged against the flexible body 806 which, upon contact, deflects downward to permit entry of the final filter 110 into the filter receiving pocket 228. When the final filter 110 is disposed within the filter receiving pocket 228 and clear of the flexible retainer 800, the flexible body 806 returns to its original position. As shown, the distal end 808 of the tab 802 abuts a portion of the final filter 110 such that the final filter 110 is retained within the filter receiving pocket 228. To remove the final filter 110 from the filter receiving pocket 228, the tab 802 may be manually urged downwards such that the distal end 808 no longer abuts the final filter 110.

Figure 9A:
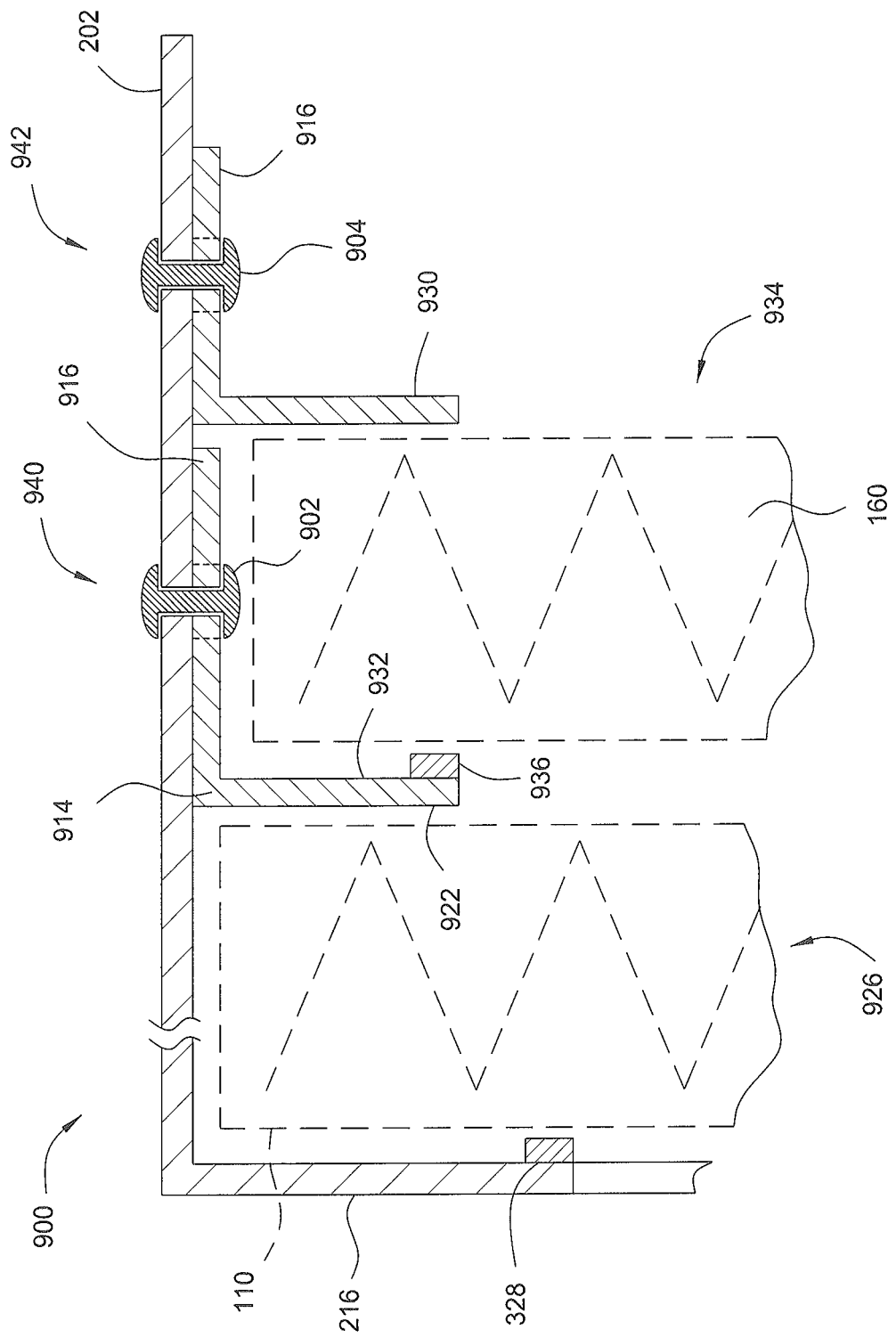
FIG. 9A is a sectional view of a holding frame having multiple rigid retainers according to one embodiment of the invention.

According to one embodiment of the invention, as shown in FIG. 9A, a holding frame 900 may be configured to retain a prefilter 160 upstream of the final filter 110. FIG. 9A depicts a holding frame 900 configured similarly to the holding frame 116, i.e., having walls 202, 204, 206 that define a central aperture 118 of the holding frame 900 and back flanges 216, 226, 236 extending inward from the walls 202, 204, 206, etc. As shown, the holding frame 900 includes a first rigid retainer 914 and a second rigid retainer 916 coupled to a top wall 202 of the holding frame 900 and configured to retain the final filter 110 and the prefilter 160, respectively, within the holding frame 900.

In one embodiment, the first rigid retainer 914 is coupled to the top wall 202 by a first engagement feature 902 disposed at a first position 940. The first position 940 is selected such that a first flange 922 of the first rigid retainer is spaced apart from the back flange 216 to define a first filter receiving pocket 926. In one embodiment, first filter receiving pocket 926 is sized to retain the final filter 110. In one embodiment, the holding frame 900 may optionally include a gasket 328 disposed between a downstream side of the final filter 110 and the back flange 216 such that the final filter 110 is sealingly coupled to the holding frame 900.

The second rigid retainer 916 may be configured to retain a prefilter 160 upstream of the final filter 110 in a second position 942. In one embodiment, the second rigid retainer 916 is coupled to the top wall 202 by a second engagement feature 904 located at a second position 942 upstream of the first position 940. The second position 942 is selected such that a second flange 930 of the second rigid retainer 916 is spaced apart relative to an upstream side 932 of the first flange 922 to define a second filter receiving pocket 934. In one embodiment, the second position 942 is selected to size the second filter receiving pocket 934 to retain the prefilter 160 (shown in phantom). In one embodiment, the holding frame 900 may include a gasket 936 disposed between a downstream side of the prefilter 160 and an upstream side 932 of the first flange 922.

Figure 9B:
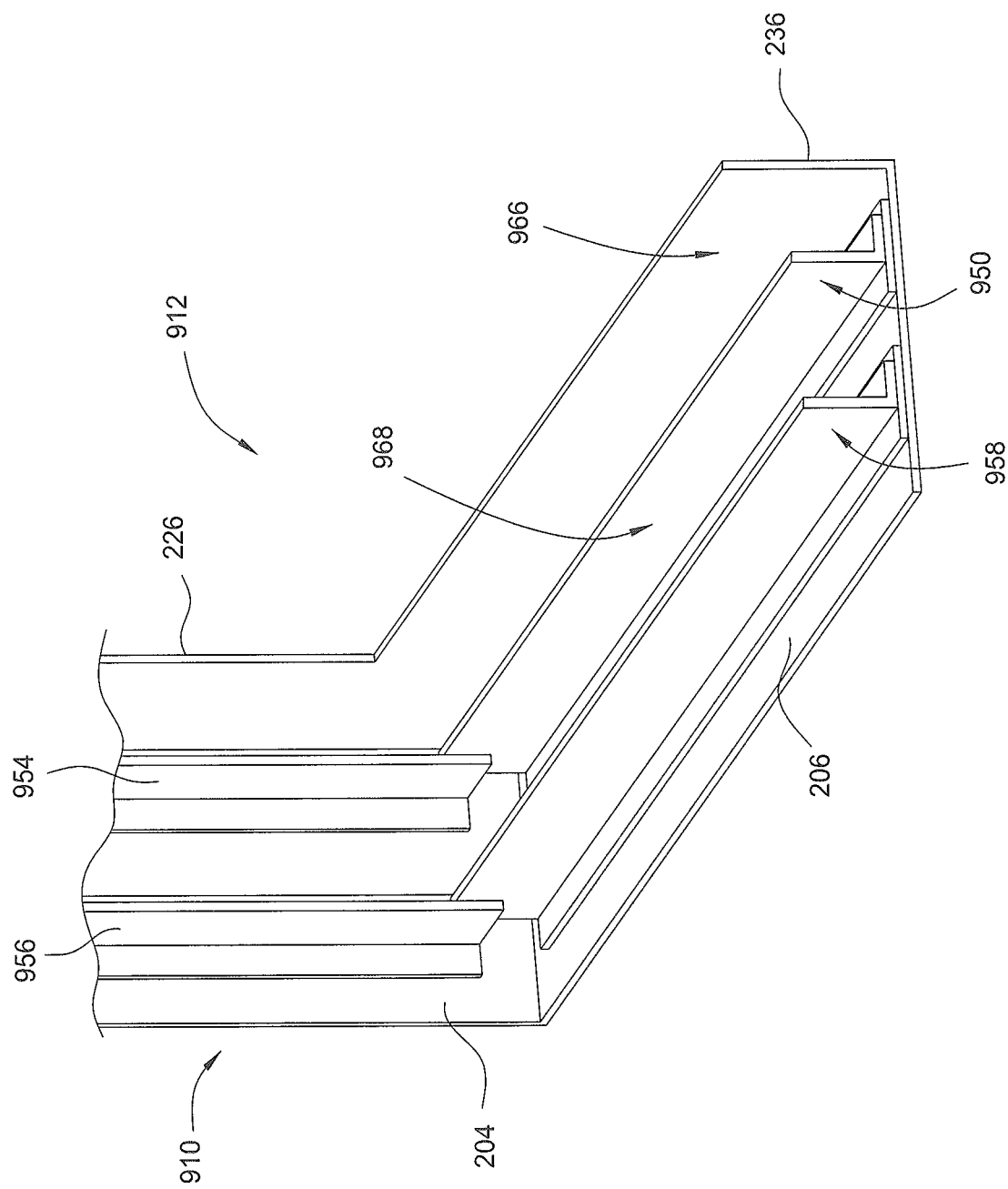
FIG. 9B is a perspective view of a holding frame having multiple flexible retainers according to one embodiment of the invention.

FIG. 9B is a cut-away perspective view of the holding frame 900 configured to hold a final filter 110 and a prefilter 160 according to one embodiment of the invention. The holding frame 900 includes a plurality of flexible retainers 950, 952, 954, 956 coupled to side walls 204 and a bottom wall 206 of the holding frame 900 by a plurality of engagement features 308.

As shown, the flexible retainers 950, 954 are coupled to the bottom wall 206 and side walls 204, respectively, and spaced apart from back flanges 236, 226 of the bottom wall 206 and side walls 204 to define a first flexible filter receiving pocket 966. In one embodiment, the first flexible filter receiving pocket 966 is sized to retain the final filter 110. The flexible retainers 952, 956 may be coupled to the bottom wall 206 and side walls 204, respectively, in a position upstream of the flexible retainers 950, 954, and spaced apart from the flexible retainers 950, 954 to define a second filter receiving pocket 968 to retain the prefilter 160 upstream of the final filter 110. In one embodiment, the flexible retainers 954, 950 configured to define a first filter receiving pocket 966 may be beveled to form a miter joint. Similarly, the flexible retainers 956, 952 that define the filter receiving pocket 968 may be beveled to form a miter joint where the sidewall 204 and bottom wall 206 intersect.

Figure 10A:
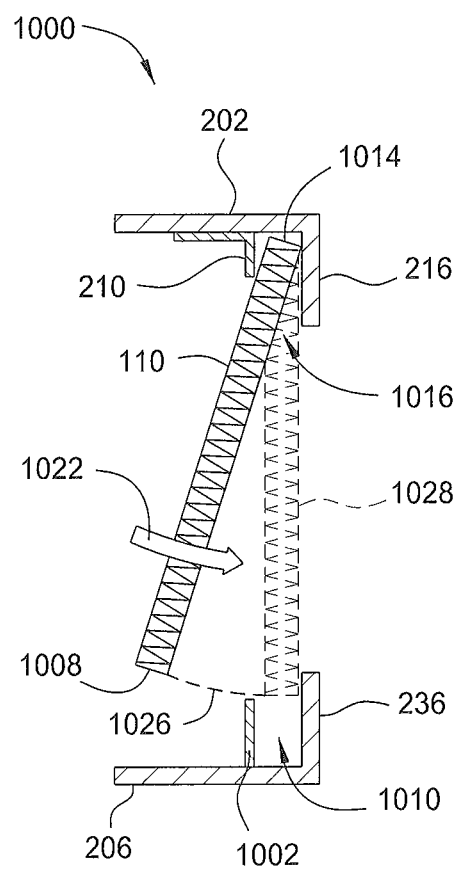
FIGS. 10A and 10B are sectional views illustrating an exemplary installation of a filter element into a holding frame according to one embodiment of the invention.
Figure 10B:
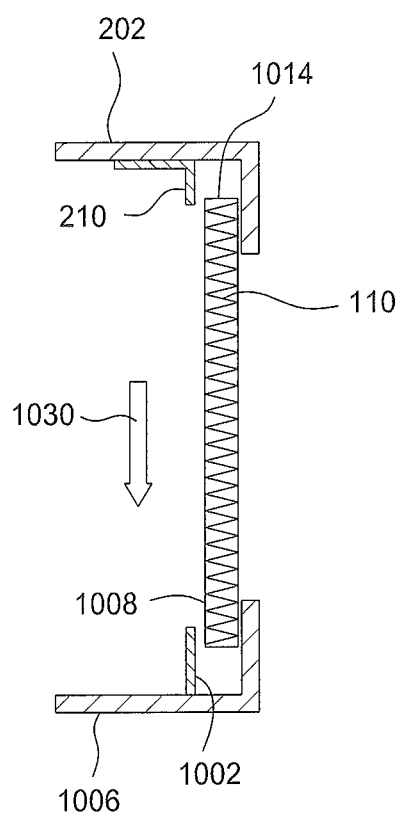

FIGS. 10A-10B are sectional views illustrating an exemplary installation of a final filter 110 into a holding frame 1000 according to one embodiment of the invention. The holding frame 1000 may be similar to and include similar elements as the holding frame 116 described above, except that the holding frame 1000 includes a gravity-assisted retention feature 1002 disposed on and extending from a bottom wall 206 of the holding frame 1000.

The retention feature 1002 may extend from the bottom wall 206 to a height sufficient to retain a bottom portion 1008 of the final filter 110 within a bottom filter receiving pocket 1010 defined between the retention feature 1002 and a back flange 236 of the holding frame 1000. In one embodiment, the retention feature 1002 may be a flange, tab, or other suitable feature extending into the central aperture 118. The retention feature 1002 may be integral to the bottom wall 206, or may be coupled to the bottom wall 206 utilizing fastening techniques known in the art. In one embodiment, the retention feature 1002 made be formed from a rigid material, such as those materials listed above.

As shown in FIG. 10A, during installation of a final filter 110, a top end 1014 of the filter is inserted, in an oblique manner, into a top filter receiving pocket 1016 defined by a rigid retainer 210 and a back flange 216. The final filter 110 is then pivoted, as shown by arrow 1022, into a position 1028 (shown in phantom) within the holding frame 1000. In the embodiment shown, the final filter 110 is rotated into a substantially vertical orientation, such that the bottom end 1024 of the final filter 110 swings into the holding frame 900. In one embodiment, the height of the retention feature 1002 is predetermined such that the bottom end 1024 clears the retention feature 1002 as the bottom end 1024 swings into the holding frame 1000, as illustrated by the dashed arc 1026.

Turning to FIG. 10B, the final filter 110 is lowered within the holding frame 1000, as shown by arrow 1030, and is supported by the bottom wall 206. The rigid retainer 210 is configured to extend down from a top wall 202 of holding frame 1000 at a height sufficient to secure the top end 1014 of the final filter 110.

Figure 11A:
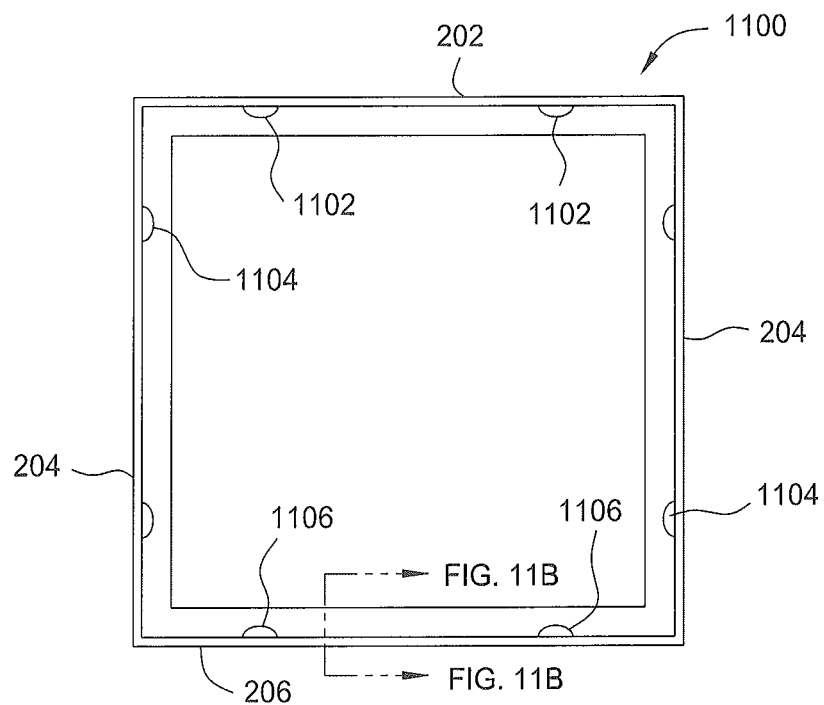
FIGS. 11A-11B depict a front plan view, and a partial sectional view, respectively, of an alternative embodiment of the holding frame of FIG. 1.
Figure 11B:
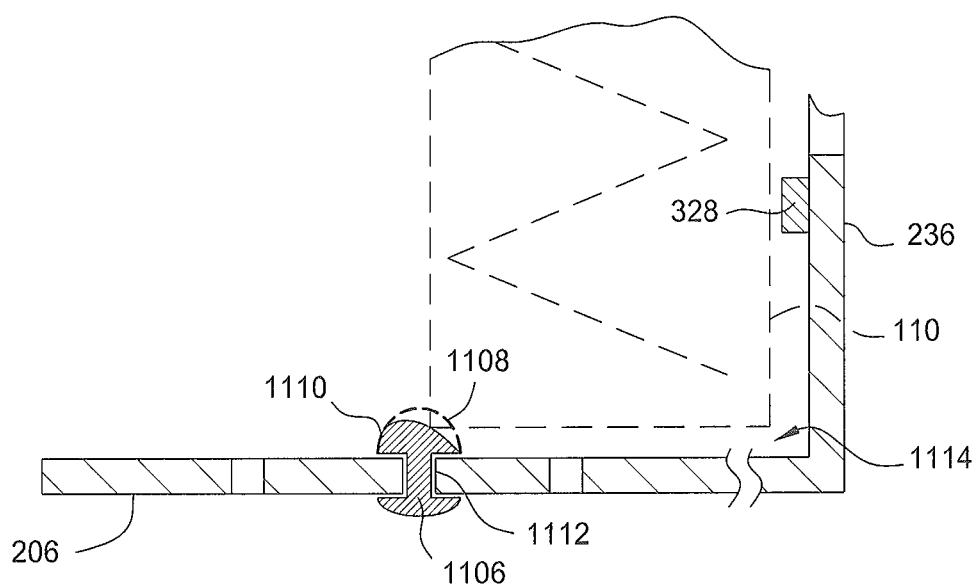

FIGS. 11A-B depict a front plan view, and a partial sectional view, respectively, of a holding frame 1100, according to an alternative embodiment of the invention. The holding frame 1100 is configured similarly to the holding frame 116, i.e., having walls 202, 204, 206 that define a central aperture 118 of the holding frame 1100 and back flanges 216, 226, 236 extending inward from the walls 202, 204, 206, etc.

In one embodiment, the holding frame 1100 includes a plurality of buttons 1102, 1104, 1106 coupled to the walls 202, 204, 206, respectively. The buttons 1102, 1104, 1106 are configured to compress to hold a final filter 110 in place between buttons on opposing walls 202, 204, 206. For example, in the embodiment shown in FIG. 11B, the button 1106 coupled to the bottom wall 206 may be compressed from an original shape, as shown by outline 1108, by a final filter 110 disposed on a top surface 1110 of the button 1106. The compression of the button 1106 urges the final filter 110 upwards while a corresponding compressed button 1102 coupled to the top wall 202 urges the final filter 110 downward, thereby holding the final filter 110 between the buttons.

In one embodiment, the buttons 1102, 1104, 1106 are disposed in apertures 1112 formed through the walls 202, 204, 206. The buttons 1102, 1104, 1106 may be removed and placed into different apertures 1112 to configure the positioning and arrangement of buttons on the walls 202, 204, 206. In one embodiment, the positions of the buttons 1102, 1104, 1106 may be selected at a predetermined distance from the back flanges 216, 226, 236 to define a filter receiving pocket 1114. In an alternative embodiment, the buttons 1102, 1104, 1106 may be coupled to the walls 202, 204, 206 by an adhesive or other suitable fastening means. In one embodiment, the buttons 1102, 1104, 1106 may be formed from resilient materials including, but not limited to, polymers such as plastics and elastomers, for example, polyethylene, nitrite and butyl and rubber.

Figure 12A:
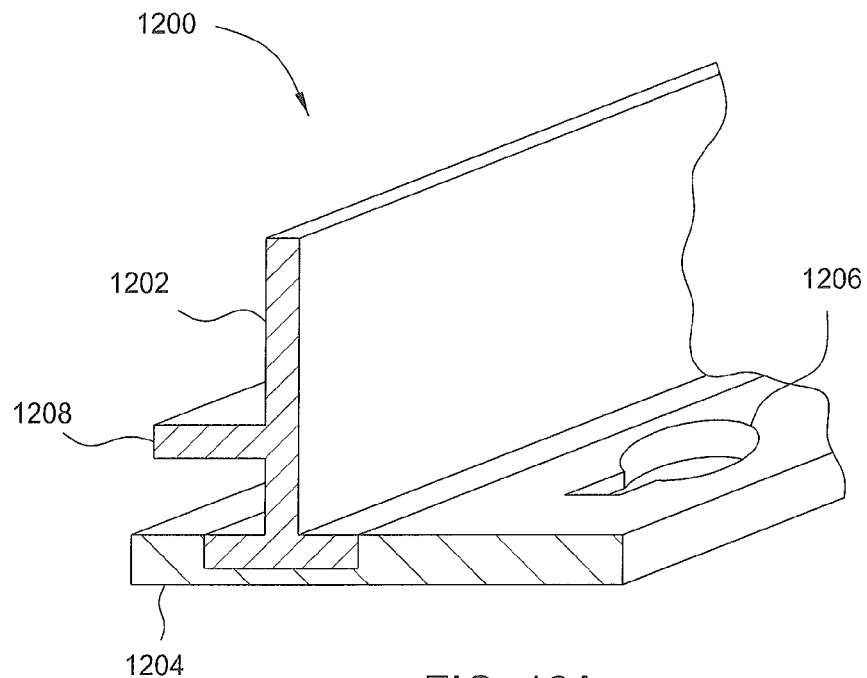
FIG. 12A depicts a perspective view of an alternative embodiment of a flexible retainer, according to one embodiment of the invention.
Figures 12B, 12C:
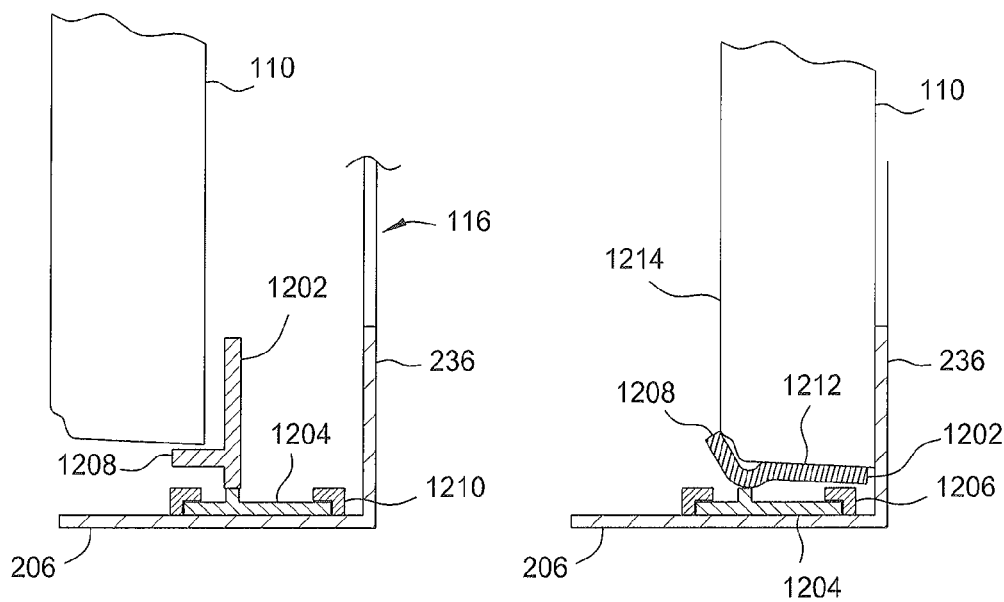
FIGS. 12B-12C depict sectional views of an alternative embodiment of the flexible retainer of FIG. 12A.

FIG. 12A depicts a perspective view of an alternative embodiment of a flexible retainer 1200 coupled to the holding frame 116, according to one embodiment of the invention. The flexible retainer 1200 includes a flexible gasket 1202 coupled to a track 1204 having a mating feature 1206 formed therethrough.

The flexible retainer 1200 may be coupled to at least one of the walls 202, 204, 206 of the holding frame 116 by the mating feature 1206 formed through the track 1204. In the embodiment shown, the mating feature 1206 is a keyhole similar to the keyhole 318 described above. In another embodiment, the mating feature 1206 of the flexible retainer 1200 may include a notch formed through a side of the track 1204. In other embodiments, the flexible retainer 1200 may be coupled to the holding frame 116 by other mating features, as shown in FIGS. 5A-B and 6A-C.

In one embodiment, the gasket 1202 of the flexible retainer 1200 extends from the wall 202, 204, 206 of the holding frame 116 towards the central aperture 118. The flexible retainer 1200 may include a flange 1208 extending from the gasket 1202 in an orientation generally perpendicular to the gasket 1202. The gasket 1202 and the flange 1208 are configured to have an L-shaped cross section suitable for retaining a final filter 110, as shown in FIGS. 12B-C.

FIGS. 12B-C depict sectional views of the flexible retainer 1200 shown in FIG. 12A coupled to the bottom wall 206 of the holding frame 116 by an engagement feature 1210. As a final filter 110 is inserted into the holding frame 116, as shown in FIG. 12B, the final filter 110 contacts the gasket 1202. The gasket 1202 is configured to bend to permit the final filter 110 to abut the back flange 236 of the holding frame 116.

As shown in FIG. 12C, the gasket 1202 is disposed against a bottom end 1212 of the final filter 110 when the final filter 110 has been inserted into the holding frame 116. The gasket 1202 is configured to have a resiliency sufficient to urge the final filter 110 upwards against an opposing wall, such as top wall 202, to hold the final filter 110 in place within the holding frame 116. In one embodiment, the final filter 110 may be compressed against gaskets 1202 coupled to opposing walls, such as top wall 202 and bottom wall 206, or opposing side walls 204.

In one embodiment, the flange 1208 is configured bend upward when the gasket 1202 flexes downward, thereby contacting an upstream side 1214 of the final filter 110. The flange 1208 is configured to retain the final filter 110 against the back flange 236 of the holding frame 116. In the embodiment shown, the flange 1208 is disposed against a notch formed from a corner of the final filter 110 as shown in FIG. 12C.

Figure 13:
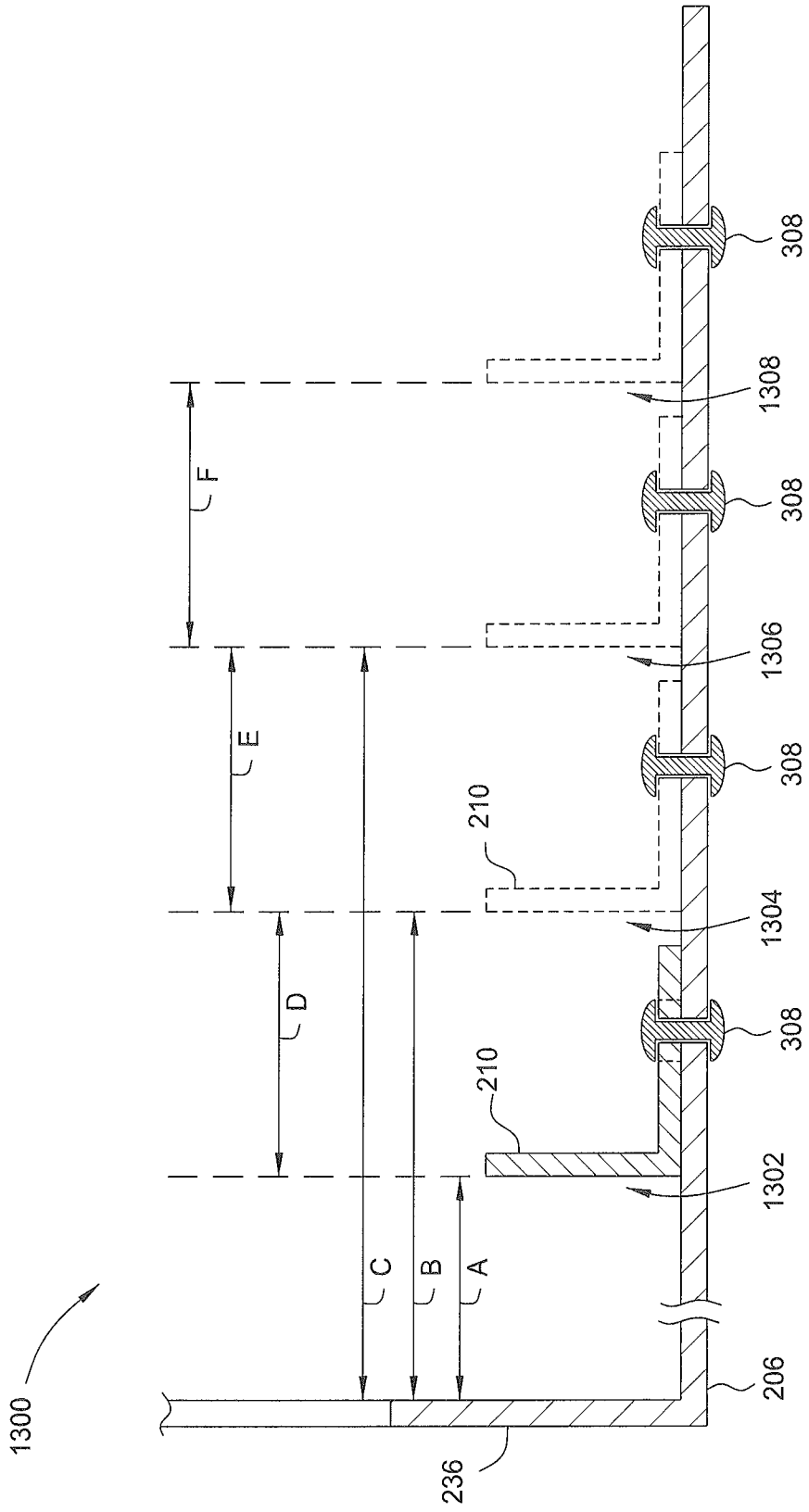
FIG. 13 is a sectional view of a holding frame having positions for coupling multiple retainers, according to one embodiment of the invention.

FIG. 13 is a sectional view of a holding frame 1300 having positions for coupling multiple retainers, according to one embodiment of the invention. The holding frame 1300 may be configured similar to the holding frame 116 except that the holding frame 1300 may be configured to removably couple one or more rigid retainers and/or flexible retainers in a variety of positions to select the spacing between the retainer(s) and a back flange of the holding frame 1300. The variety of positions permit filters having different depths to be accommodated in a single holding frame without the need of special tools and/or additional components.

In one embodiment, the holding frame 1300 includes a plurality of engagement features 308 coupled at a plurality of positions 1302, 1304, 1306, 1308. The positions 1302, 1304, 1306, 1308 are selected within the holding frame 1300 to have predetermined distances from the back flanges 216, 226, 236 and/or between the positions 1302, 1304, 1306. As shown in FIG. 13, a first retaining member, such as the rigid retainer 210, is removably coupled to the bottom wall 206 by the engagement feature 308 at a first position 1302 such that the rigid retainer 210 is spaced from the back flange 236 by a distance having a length A. As such, while coupled at the first position 1302, the rigid retainer 210 may retain a final filter 110 having a depth less than or equal to length A. To accommodate a final filter having a depth larger than length A, the rigid retainer 210 may alternatively be coupled to the holding frame 1300 at a second position 1304 or a third position 1306 such that the rigid retainer 210 is spaced from the back flange by a distance having a length B or length C, respectively.

In another embodiment, a second retaining member, such as a rigid retainer 210, may be coupled to at least one of the walls 202, 204, 206 at a position 1304, 1306, 1308 upstream of the final filter 110 to retain a prefilter 160 within the holding frame 1300. In the example having a first retaining member coupled at the first position 1302, another rigid retainer 210 may be coupled at the second position 1304, upstream of the first position 1302, to select a filter receiving pocket having a depth of length D for holding a prefilter 160 having a depth of less than or equal to length D upstream of the final filter 110. Similarly, where a first retaining member may be coupled at position 1304 or 1306, a second retaining member may be coupled at positions 1306, 1308 upstream of the first retaining member to hold a prefilter 160 having a depth of less than or equal to length E and F.

While the engagement features 308 at positions 1302, 1304, 1306, 1308 are depicted in FIG. 13 as being equidistantly spaced, other arrangements are contemplated to accommodate a variety of configurations and sizes of final filters. For example, engagement features positioned at a first position 1302 may be arranged such that a retaining member is spaced apart from a back flange by 3 inches, while engagement features positioned at a second position 1304 may be arranged such that a flange of a rigid retainer is spaced apart from the back flange by only 4 inches.

Figure 14:
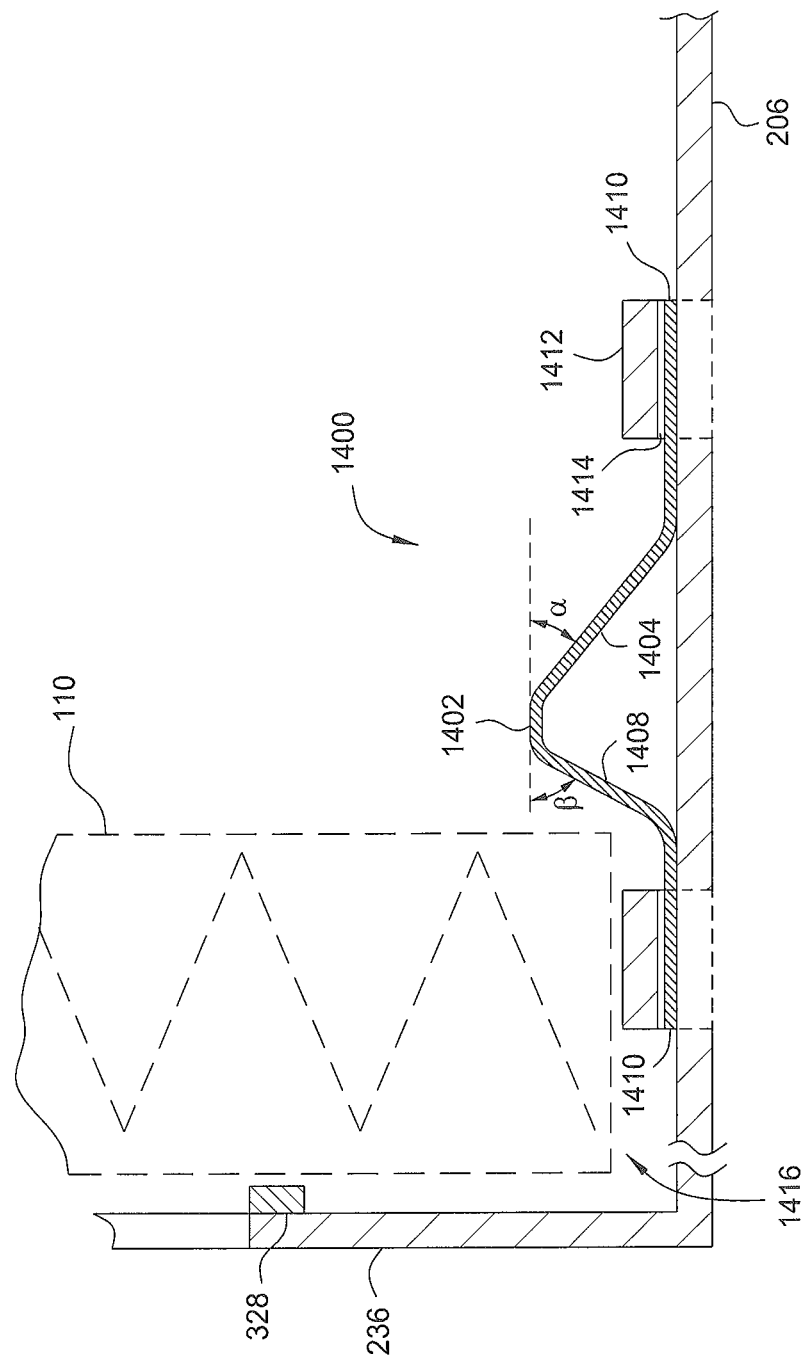
FIG. 14 is a partial sectional view of an alternative embodiment of the flexible retainer of FIG. 7 according to one embodiment of the invention.

FIG. 14 is a partial sectional view of an alternative embodiment of a flexible retainer disposed within the holding frame 116. In the embodiment shown, the flexible retainer is a flexible retainer 1400 removably coupled to the bottom wall 206 by at least one lance 1412. The flexible retainer 1400 includes a flexible body 1402 having a sloped portion 1404 and a retaining portion 1408. The flexible retainer 1400 is secured to the bottom wall 206 by at least one distal end 1410 being retained within an opening 1414 formed by the lances 1412. In one alternative embodiment, the distal end 1410 includes a barbed member configured to prevent removal of the distal end 1410 from the lances 1412. The flexible retainer 1400 is positioned within the holding frame 116 such that the retaining portion 1408 and back flange 236 are spaced apart to define a filter receiving pocket 1416. The flexible body 1402 is configured to bend and flatten downwards upon contact with the sloped portion 1404 and has a resiliency sufficient to return to its original, raised position when no longer contacted.

During a filter installation procedure, a final filter 110 is urged against the sloped portion 1404, which is inclined at an angle α relative to the bottom wall 206 such that a final filter 110 may enter the filter receiving pocket 1416. Upon contact with the sloped portion 1404, the flexible body 1402 flattens, decreasing angle α of the sloped portion 1404 and permitting entry of the final filter 110. When the final filter 110 is disposed within the filter receiving pocket 1416 and no longer containing the sloped portion 1404, the flexible body 1402 returns to its original raised position whereby the retaining portion 1408 is inclined at an angle β to retain the final filter 110. To remove the final filter 110, the flexible retainer 1400 may be manually flattened downward.

Figure 15:
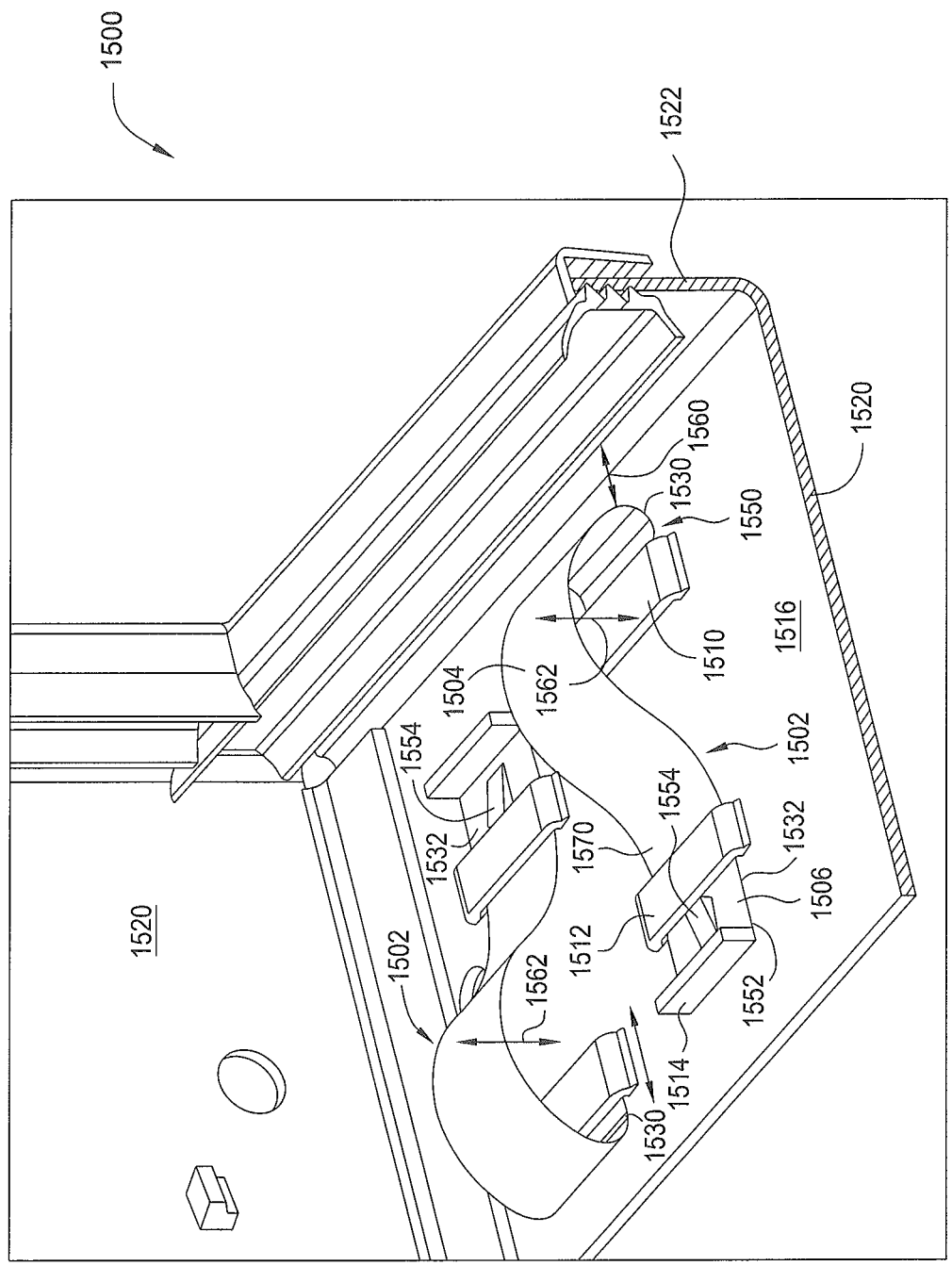
FIG. 15 is a partial perspective view of another embodiment of a holding frame assembly having a holding frame and filter retaining flexible retainer, according to one embodiment of the invention.

FIG. 15 is a partial perspective view of another embodiment of a holding frame assembly 1500 having a holding frame 1516 and at least one filter retaining flexible retainer according to one embodiment of the invention. The filter retaining flexible retainer 1502 has a flat body 1570 that includes a retaining portion 1504 disposed at a first end 1550 having a first strip 1530 and a fixed portion 1506 disposed at a second end 1552 having a second strip 1532. In some embodiments, the first strip 1530 and/or the second strip 1532 is at least substantially planar. In one embodiment, the first and second strips 1530, 1532 are linearly aligned and coplanar. At least the retaining portion 1504 of the filter retaining flexible retainer 1502 is made of a resilient material suitable for exerting a force upon a filter engaged with the filter retaining flexible retainer 1502 so as to retain the filter within the filter holding frame 1516. The flat body 1570 of the filter retaining flexible retainer 1502 may be in the form of a flat spring. In one embodiment, at least the retaining portion 1504 of the filter retaining flexible retainer 1502 is made of spring steel. In another embodiment, the entire filter retaining flexible retainer 1502 is made of spring steel.

The filter retaining flexible retainer 1502 may be removably attachable to the interior of the holding frame 1516 in an orientation that urges the final filter 110 against at least one of the sidewalls 1520 or flange 1522. As shown in FIG. 15, one or more flexible retainers 1502 may be affixed to only one sidewall 1520 to retain a filter within the holding frame 1516. However, it is contemplated that flexible retainers 1502 may be affixed to at least two opposing sidewalls 1520, including three sidewalls 1520 or even four sidewalls 1520.

In one embodiment, the filter retaining flexible retainer 1502 may be attached to the holding frame 1516 in two orientations 180 degrees apart to allow the retaining portion 1504 of the flexible retainer 1502 to be positioned at different distances from the flange of the holding frame 1516, thereby allowing both final filters and prefilters to be secured with flexible retainers 1502 having identical dimensions.

The retaining portion 1504 may have a bowed shape to form the spring element of the body 1570. The bowed shape of the retaining portion 1504 may be formed by configuring the flexible retainers 1502 in a hook shape, having the first end 1550 pointed back towards the second end 1552, such that a front face 1602 of the retaining portion 1504 and the second end 1552 defines the overall length of the flexible retainer 1502. The profile of the flexible retainer 1502 is better illustrated in FIGS. 16 and 17.

The retaining portion 1504 of the flexible retainer 1502 is captured by the holding frame 1516 or fixedly coupled to the holding frame 1516 by a first retaining feature 1510 that allows clearance for the retaining portion 1504 to move and deflect in a direction parallel to the flow of air through the holding frame 1516, as indicated by arrows 1560, which urges the final filter 110 against the flange 1522 of the holding frame 1516. In one embodiment, the first strip 1530 at the first end 1550 of the flexible retainer 1502 is disposed under the first retaining feature 1510. The resilient material of the retaining portion 1504 also allows the retaining portion 1504 deflect to move in a direction perpendicular to the flow of air through the holding frame 1516, as indicated by arrows 1562, which urges the final filter 110 towards the opposing sidewall 1520 and against the opposing flexible retainer 1502, thereby securing the filter in the holding frame 1516.

The fixed portion 1506 of the flexible retainer 1502 is captured by the holding frame 1516 or sildably coupled to the holding frame 1516 by at least one retaining feature in a manner that fixes the second end 1552 of the flexible retainer 1502 to the holding frame 1516. In one embodiment, the second strip 1532 of the second end 1552 of the flexible retainer 1502 is disposed under a second retaining feature 1512. The second strip 1532 of the flexible retainer 1502 includes a mounting feature 1554 or other lock that prevents the second end 1552 from passing under the second retaining feature 1512 in the direction towards the first end 1550. For example, the mounting feature 1554 may be in the form of a tab or barb that deflects to allow the second end 1552 of the flexible retainer 1502 to pass under the second retaining feature 1512 in one direction while preventing the flexible retainer 1502 from back out from under the second retaining feature 1512. In one embodiment, the fixed portion 1506 is removably coupled to the holding frame 1516 by the mounting feature 1554. The mounting feature 1554 in the form of a tab may be configured such that the tab may be manually depressed to allow removal of the tab from the holding frame 1516. A third retaining feature 1514 maybe positioned on the holding frame 1516 to limit the amount of movement the second end 1552 may have relative to the holding frame 1516. For example, the third retaining feature 1514 maybe a lanced tab extending inwards from the holding frame 1516 on the side of the second retaining feature 1512 opposite the first retaining feature 1510 so that the second strip 1532 at the second end 1552 of the flexible retainer 1502 abuts the third retaining feature 1514 with the mounting feature 1554 engaged with the second retaining feature 1512. The mounting feature 1554 may have alternative configurations, such as a hole for a fastener, a detent, or other structure suitable for retaining the retainer 1502 to the holding frame 1516.

Figure 16:
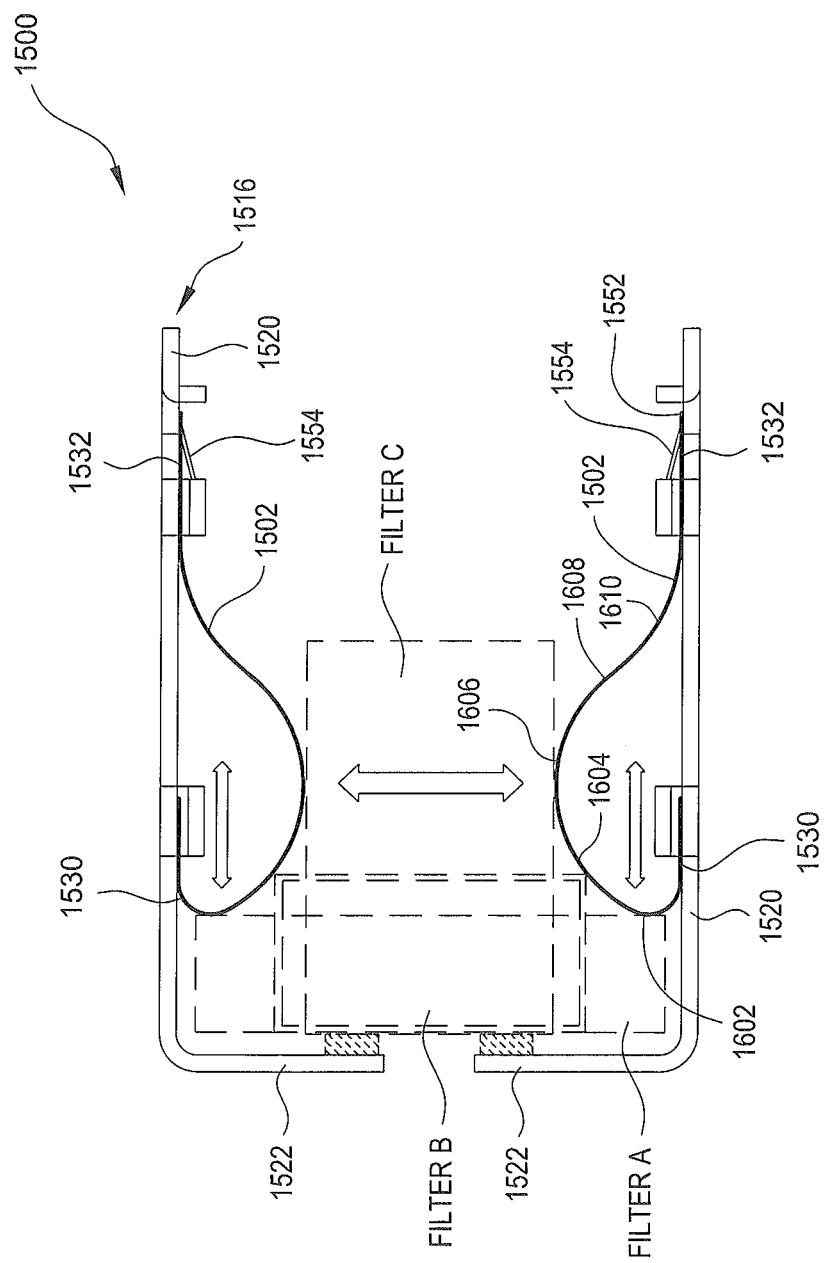
FIG. 16 is a partial side view of the holding frame assembly of FIG. 15 illustrating filters retained in three alternative positions.

FIG. 16 is a partial side view of the holding frame assembly 1500 of FIG. 15 illustrating filters retained in three alternative positions. As discussed above, the retaining portion 1504 of the flexible retainer 1502 can deflect in two different orthogonal directions allowing the retaining portion 1504 of the flexible retainer 1502 to secure different size filters using the same flexible retainer 1502 secured to the holding frame 1516 in the same set of retention features 1508, thereby reducing the need for a wide variety of clips as conventionally utilized. For example, Filter A having shallow depth may be secured by the front face 1602 of the retaining portion 1504, Filter B having medium depth may be secured by a front sloped region 1604 of the retaining portion 1504, while Filter C having deep depth may be secured by a top face 1606 of the retaining portion 1504. The top face 1606 defines a portion of the body 1570 spaced farthest from the plane of the strips 1530, 1532. In one embodiment, the first and second strips 1530, 1532 are linearly aligned and laterally offset from the top face. When the flexible retainer 1502 is in a reversed orientation, a back sloped face 1608 and a back curved face 1610 of the retaining portion 1504 may be utilized to hold filters, such as illustrated in FIG. 15.

In one embodiment, the first end 1550 points in the same direction as the second end 1552. The first planar strip 1530 extends from the first end 1550 to the front face 1602. The front face 1602 has a substantially convex curve and defines the portion of the body 1570 located farthest from the second end 1552. The front face 1602 curves out of the plane of the strip 1530 and connects to the front sloped region 1604. The front sloped region 1604 extends from the front face 1602 towards the second end 1552 to the top face 1606, The top face 1606 defines the region of the body 1570 that is spaced laterally the farthest from the strips 1530, 1532. The top face 1606 slopes back towards and is connected to the back sloped face 1608 to form a substantially convex shaped curve. The back sloped face 1608 is connected to the back curved face 1610 at an inflection point of their slopes. The back curved face 1610 is connected to the second strip 1532 of the fixed portion 1506 at the second end 1552. As discussed above, the structure of above mentioned features of the flexible retainer 1502 advantageously allow the flexible retainer 1502 to secure different size filters with a single retainer.

Additional views of one embodiment of the flexible retainer 1502 are provided. FIG. 17 is a partial side view of the holding frame assembly 1500 of FIG. 15 illustrating a side view of the flexible retainer 1502 secured to the holding frame

1516. FIG. 18 is a perspective view of the filter retaining flexible retainer 1502 of FIG. 15. FIG. 19 is a top view of the filter retaining flexible retainer 1502 of FIG. 15. FIG. 20 is a bottom view of the filter retaining flexible retainer 1502 of FIG. 15. FIG. 21 is a side view of the filter retaining flexible retainer 1502 of FIG. 15. FIG. 22 is another side view of the filter retaining flexible retainer 1502 of FIG. 15.

Since little or no tools are used to remove and secure final filters 110 to the holding frame 116, filter replacement is rapid, efficient, and at minimal cost relative to filter exchanges in conventional systems. Additionally, as both the final filter and optional prefilter may be installed in the holding frame without use of custom-sized flexible retainers or clamps, filter maintenance may be simplified to no longer require a confusing inventory of custom flexible retainers and wire clips for each type of filter utilized. Moreover, the holding frame 116, no longer having to support a swath of clips and clamps, may be manufactured without superfluous apertures at a reduced cost.

Moreover, the flexible retainers are also allow for a greater variety of filter depths to be utilized, thereby reducing the amount of different flexible retainers required. Since the flexible retainers are physically retained to the holding frames, the potential for damage to the filters during installation is reduced, along with the potential for the loss of the flexible retainers.

While the foregoing is directed to embodiments of the invention, other and further embodiments of the invention may be devised without departing from the basic scope thereof, and the scope thereof is determined by the claims that follow.

The invention claimed is:

1. A flexible filter for a holding frame, comprising:
 a flat body extending from a first end to a second end, wherein the body comprises:
  a bowed shaped retaining portion disposed at the first end and comprising a first strip, a front face and a top face, wherein the first end is configured to slideably engage a retaining feature of the holding frame, and
  a fixed portion disposed at the second end and comprising a second strip, wherein the first and second strips are linearly aligned and laterally offset from the top face and wherein the front face is at a distance furthest from the second end and configured to engage a filter.

2. The flexible filter retainer of claim 1, wherein the first strip and the second strip are coplanar.

3. The flexible filter retainer of claim 1, wherein the first strip and the second strip are substantially planar.

4. The flexible filter retainer of claim 1, wherein the first strip is connected to a front face that defines the portion of the body farthest from second end.

5. The flexible filter retainer of claim 4, wherein the front face is a substantially convex curve.

6. The flexible filter retainer of claim 4, wherein the retaining portion comprises a front sloped region extending from the front face away from a plane of the first strip.

7. The flexible filter retainer of claim 6, wherein the top face is connected to the front face, the top face defining a portion of the body spaced laterally the farthest from the plane of the first strip.

8. The flexible filter retainer of claim 7, wherein the retaining portion further comprises a back curved face extending from the top face and connected to a back sloped face at an inflection point.

9. The flexible filter retainer of claim 8, wherein the back sloped face is connected to the second strip.

10. The flexible filter retainer of claim 8, wherein the back curved face is a substantially concave curve.

11. The flexible filter retainer of claim 1, wherein the body comprises a flat spring.

12. The flexible filter retainer of claim 1, wherein the body comprises spring steel.

13. The flexible filter retainer of claim 1, wherein the second strip comprises a mounting feature configured to be removably attachable to a holding frame.

14. The flexible filter retainer of claim 13, wherein the mounting feature is a tab.

15. The flexible filter retainer of claim 1, wherein the first and second ends are pointing in the same direction.

16. A filter holding frame assembly, comprising:
 a holding frame comprising:
  a plurality of was coupled to form a quadrilateral ring, the walls having retaining features; and
  a flange extending inward from a back edge of each wall; and
 flexible filter retainers coupled to the holding frame, wherein each retainer comprises a flat body extending from a first end to a second end, and wherein the body comprises:
  a retaining portion disposed at the first end and fixedly coupled to the holding frame, and
  a fixed portion disposed at the second end and slideaby coupled to the holding frame by the retaining feature.

17. The filter holding frame assembly of claim 16, wherein the fixed portion is removably coupled to the holding frame by a mounting feature.

18. The filter holding frame assembly of claim 16, wherein the retaining portion and the fixed portion comprise linearly aligned, coplanar strips.

19. The filter holding frame assembly of claim 16, wherein the body of the flexible filter retainer comprises a flat spring.

20. The filter holding frame assembly of claim 16, wherein the retaining portion comprises:
 a first convex face defining a portion of the body farthest from the fixed portion; and
 a second convex face defining a portion of the body farthest away from a plane defined by the first and second ends.

* * * * *